US012608179B2

(12) United States Patent
Rajendran et al.

(10) Patent No.: US 12,608,179 B2
(45) Date of Patent: Apr. 21, 2026

(54) GRAPH BASED CUSTOMIZED APPLICATION DEVELOPMENT AND MANAGEMENT SYSTEM

(71) Applicant: Protium Finance Limited, Mumbai (IN)

(72) Inventors: Gautham Kumar Rajendran, Bangalore (IN); Padmanabhan Balasubramanian, Bellandur (IN); Dhrumil Jayantkumar Shah, Bangalore (IN); Vivek Chhikara, Bangalore (IN)

(73) Assignee: Protium Finance Limited, Mumbai (IN)

( * ) Notice: Subject to any disclaimer, the term of this patent is extended or adjusted under 35 U.S.C. 154(b) by 133 days.

(21) Appl. No.: 18/467,518

(22) Filed: Sep. 14, 2023

(65) Prior Publication Data

US 2025/0094140 A1 Mar. 20, 2025

(51) Int. Cl.
*G06F 8/34* (2018.01)
*G06F 8/36* (2018.01)
(Continued)

(52) U.S. Cl.
CPC .................. *G06F 8/34* (2013.01); *G06F 8/36* (2013.01); *G06F 16/906* (2019.01); *H04L 67/10* (2013.01);
(Continued)

(58) Field of Classification Search
CPC .......... G06F 8/22; G06F 8/433; G06F 16/906; G06F 16/212; G06F 11/0793; G06F 8/34;
(Continued)

(56) References Cited

U.S. PATENT DOCUMENTS

| | | | | |
|---|---|---|---|---|
| 11,238,048 B1 * | 2/2022 | Breeden | ................ | G06F 16/906 |
| 2003/0177018 A1 * | 9/2003 | Hughes | .................. | G06Q 99/00 |
| | | | | 703/6 |

(Continued)

OTHER PUBLICATIONS

Cai et al, CN 114037517 (translation), Feb. 11, 2022, 16 pgs <CN_114037517.pdf>.*

*Primary Examiner* — Tuan A Vu
(74) *Attorney, Agent, or Firm* — Polsinelli PC

(57) ABSTRACT

A method and corresponding computing apparatus allow development of computer-implemented applications. The method includes providing a directed graph including vertices, and directed edges connecting respective pairs of the vertices. The directed graph represents the workflow, the vertices are associated with respective predefined tasks in the workflow and the directed edges represent transitions or dataflow between the predefined tasks. Further, the method includes modifying the predefined tasks based on received parameters to customize implementations of the predefined tasks and retrieving application programming interfaces (APIs) that implement the predefined tasks. Further, by integrating the APIs using a workflow orchestration engine (WOE), executable instructions are provided to perform the workflow represented by the directed graph. An authentication mechanism that allows defining custom authentication flows for different vertices of the workflow or different components of the apparatus. The WOE coordinates rendering a user interface to receive input data, publishing and consuming the granular events.

18 Claims, 21 Drawing Sheets

(51) Int. Cl.

| | |
|---|---|
| *G06F 16/906* | (2019.01) |
| *H04L 67/10* | (2022.01) |
| *G06F 11/07* | (2006.01) |
| *G06F 16/21* | (2019.01) |
| *G06Q 20/10* | (2012.01) |
| *G06Q 99/00* | (2006.01) |

(52) U.S. Cl.
CPC ........ *G06F 11/0793* (2013.01); *G06F 16/212* (2019.01); *G06Q 20/102* (2013.01); *G06Q 99/00* (2013.01)

(58) Field of Classification Search
CPC ........ G06F 8/36; G06Q 99/00; G06Q 20/102; H04L 67/10
See application file for complete search history.

(56) References Cited

U.S. PATENT DOCUMENTS

2014/0052617  A1*    2/2014   Chawla ................ G06Q 20/102
                                                            705/39
2021/0385251  A1*   12/2021   Crabtree ................. H04L 67/10
2022/0342797  A1*   10/2022   Malamut ............. G06F 11/0793
2023/0169360  A1*    6/2023   Busany ................ G06F 16/212
                                                            706/46

* cited by examiner

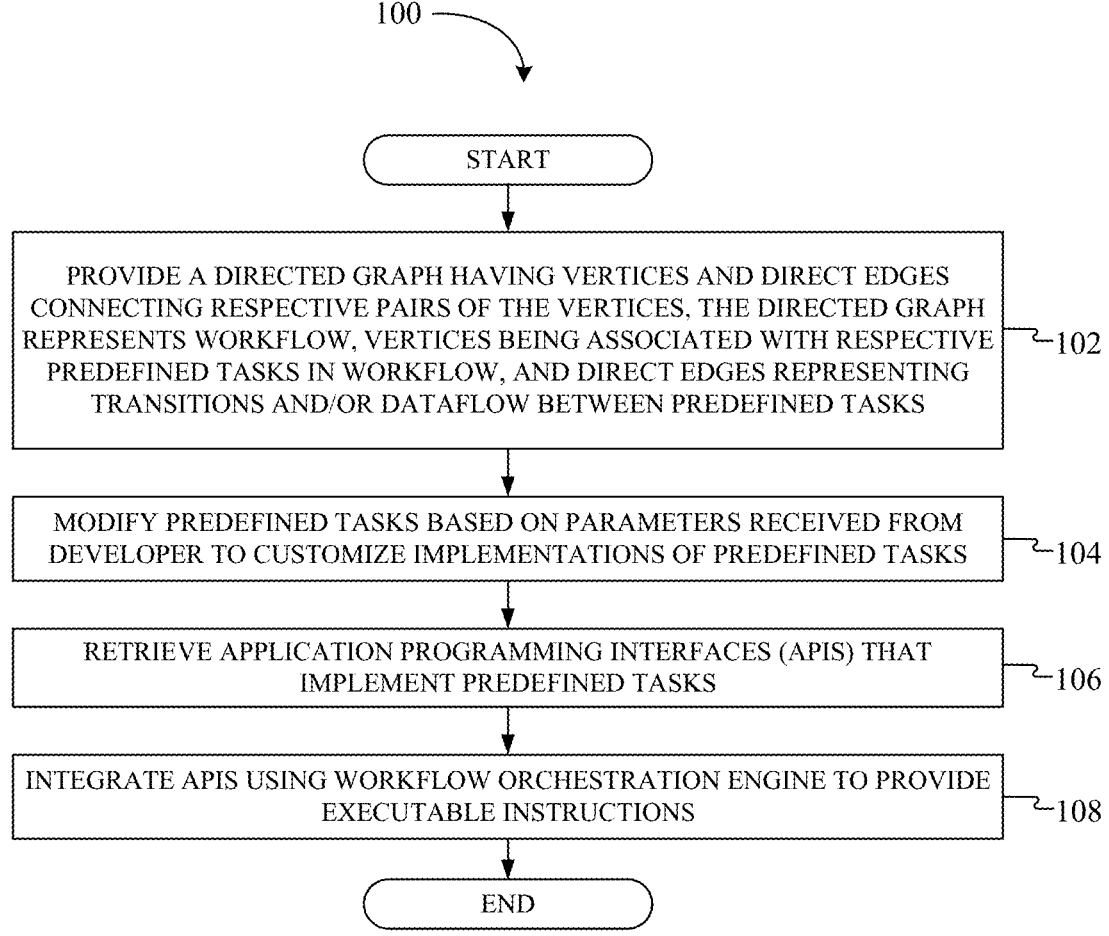

100

START

PROVIDE A DIRECTED GRAPH HAVING VERTICES AND DIRECT EDGES CONNECTING RESPECTIVE PAIRS OF THE VERTICES, THE DIRECTED GRAPH REPRESENTS WORKFLOW, VERTICES BEING ASSOCIATED WITH RESPECTIVE PREDEFINED TASKS IN WORKFLOW, AND DIRECT EDGES REPRESENTING TRANSITIONS AND/OR DATAFLOW BETWEEN PREDEFINED TASKS    ⌐102

MODIFY PREDEFINED TASKS BASED ON PARAMETERS RECEIVED FROM DEVELOPER TO CUSTOMIZE IMPLEMENTATIONS OF PREDEFINED TASKS    ⌐104

RETRIEVE APPLICATION PROGRAMMING INTERFACES (APIS) THAT IMPLEMENT PREDEFINED TASKS    ⌐106

INTEGRATE APIS USING WORKFLOW ORCHESTRATION ENGINE TO PROVIDE EXECUTABLE INSTRUCTIONS    ⌐108

END

GRAPH BASED CUSTOMIZED APPLICATION DEVELOPMENT AND MANAGEMENT SYSTEM

TECHNICAL FIELD

The present technology relates to software application development, and, more particularly, but not by way of limitation, the present technology relates to providing a platform for developing customized software applications.

BACKGROUND

Software development can be a difficult and time-consuming activity. Conventional software development approaches employ a monolithic architecture, which often has-significant downtime due to debugging and software testing throughout the development and deployment cycle. Microservices architecture, on the other hand, overcomes various challenges common to the monolithic architecture and is comparatively advantageous with respect to the monolithic architecture. The microservices architecture is supported from different platforms for different processes over an entire cycle of developing and executing a software product/application. However, the different platforms operate in silos and may lack compatibility leading to ineffective communication between the different platforms. The incompatibility between the different platforms creates complexities related to visibility of current status of execution of the different processes across the different platforms.

Further, flow of data between the different platforms is affected due to the incompatibility. Integrating the different platforms is complex due to the incompatibility between the different platforms. And each process, over the entire cycle of developing and executing the software product/application, includes multiple tasks that are to be executed to complete the process. Conventional tools allow a user to automate the task. The tasks, however, involve multiple systems that are external to a current system for executing the process, and these multiple systems are then integrated into the current system at various points that are used for automation. The external systems, for example, may be cloud-based software or open-source software (OSS) systems.

Ideally, a user would write a code for integrating the multiple systems or corresponding Application Programming Interfaces (APIs). The user may be compelled to rewrite the code for each instance of update or inclusion of a new task. Creation and recreation or updating the code increases the overhead due to custom code development performed for integration. Also, the codes rewritten over time would be different or in a different style since multiple developers may be involved in the creation and recreation or updating the codes. There also exists a possibility that a former developer is aware of a problem that would arise while writing or executing a code and a corresponding solution to the problem. In some scenarios, a new developer may write a code for the integration and may encounter the problem previously faced by the former developer, but the new developer may be unaware of the solution and may code in a different way to overcome the problem.

As a result, the software product/application has a slow roll out, initially and each update adds to the delay. The resulting increase in time to market makes it challenging for the software product/application to satisfy the demands of the market. Further, the software product/application is unable to withstand or cater to updates or modifications, in a uniform way, that would be required over time.

In the microservices architecture, each service is responsible for performing business logic and the microservices architecture has a dedicated database. The microservices architecture, thus, allows scaling of services based on load requirements. However, there exists a necessity for a frontend or a backend, also referred to as an orchestration layer, for coordinating execution of the services. The orchestration layer is configured by a developer and becomes opaque or difficult to manage/change.

Further, in some scenarios that require different or additional functionalities from the software product/application, one or more new platforms would be required to be integrated along with the different platforms that may already have been integrated. In such scenarios, another custom code may be written for integrating one or more new platforms in a style previously utilized for integrating the different platforms. To achieve uniformity and executability, a user may have to spend multiple hours, which leads to a low degree of reusability of the custom code for further enhancements and leads to wasteful resources. Further, extensive usage of the codes for each step or process fails to support transparency into overall process related to the software product/application. Also, to incorporate any update or modification, the custom code should be modified, which results in an unnecessary regression cycle leading to redundant expenses in terms of time and money. In some scenarios, the software product/application may be purchased off-the-shelf. However, the off-the-shelf software product/application may have limited or redundant features for the intended use, thus, again requiring custom code development. This leads to a process which is difficult, time-consuming, or expensive, just as any traditional software development would be.

Additionally, with systems such as cloud-based software systems or applications, some of the OSS may not be natively supported for running on the cloud and cannot be utilized by the cloud-based software systems. The OSS may work well on a standalone basis but may fail during the integration with the cloud-based software systems and may also fail to cater to special use cases. Further, rendering a user interface or forms as is, may not be aesthetically pleasing, thus negatively affecting customer experience. Further, even if the developer has integrated a version of the OSS and ensured compatibility with the cloud, there exists a possibility of breaking the integration on updating the version of the OSS. Thus, for completing the process, compatibility between the multiple systems is a necessity. However, the multiple systems may fail to integrate, which leads to a requirement for developing custom codes for the each of the multiple systems.

Alternatively, a wrapper may be written to address problems related to the integration, ensuring that the services would be used consistently. To use the services, the developers write codes during a development phase, which go through a testing phase. Depending on how different developers interpret, the codes may be qualitatively and quantitatively different due to usage of different styles and different ways or approaches captured by the codes. The qualitative and quantitative difference leads to problems due to lack of consistency while integrating. This in turn leads to customizations and writing more wrappers and requirement of more time.

Further, traditional software development requires at least a user interface (UI), a server, Application Programming Interface (APIs), and middleware as basic units. However, for a small change or an update to one of the units (e.g. the UI) other basic units including, without limitation, the APIs, middleware, have to be changed or modified, as well, and further the updated basic unit have to undergo a testing phase too. With multiple changes, the lifecycle management of the developed software tends to be complex and expensive from development, testing, and deployment.

SUMMARY

Exemplary embodiments of the present disclosure introduce a selection of concepts in a simplified form that are further disclosed in the detailed description of the invention. The summary is not intended to determine the scope of the claimed subject matter.

In accordance with exemplary embodiments, a method for creating computer implemented applications is provided. The method describes a directed graph representing a workflow. The directed graph has vertices and directed edges that connect respective pairs of the vertices. The vertices are associated with respective predefined tasks in the workflow and the directed edges represent transitions or dataflow between the predefined tasks. The predefined tasks associated with the vertices include one or more of a timers task, a service task, or a user task. The vertices are respectively assigned symbols from a palette of symbols. Each of the assigned symbols is associated with a corresponding predefined task of the predefined tasks and one or more symbols corresponding to the service task are associated with one or more Application programming interfaces (APIs) in an API-marketplace (API-MP).

In the method, the predefined tasks are modified based on parameters received from a developer to customize implementations of the predefined tasks. APIs that implement the predefined tasks are retrieved. The retrieved APIs are independently implementable without requiring a separate middleware or a separate user interface (UI). The retrieval of the APIs that implement the predefined tasks includes selecting the APIs via interactions with an external cloud service API. The APIs are listed in the API-MP and are selected in accordance with a definition of the predefined tasks corresponding to the respective vertices and binding inputs and outputs of the selected APIs to variables in the workflow. The APIs that implement the predefined tasks are retrieved by selecting an API from the one or more APIs associated with a symbol at the given vertex of the directed graph.

In some embodiments of the method, the APIs are integrated using a workflow orchestration engine to provide executable instructions. The executable instructions on being executed by a processor perform the workflow represented by the directed graph. The workflow orchestration engine coordinates rendering of a UI by a renderer comprising a frontend library, to receive input data. The workflow orchestration engine further coordinates publishing granular events at a broker and consuming the granular events at a data consumer and directing the consumed granular events to a data sink. The workflow is executed by the workflow orchestration engine by interacting with the API-MP to send the variables of the workflow as inputs in calls to the APIs and binding outputs to the variables of the workflow. For receiving input from a user of the executable instructions, the user task includes a form with a field such that the form includes customizable settings. The form is generated based on reconstruction of a schema and rendered on a user interface, the schema being reconstructed by a renderer library during execution of a step of the workflow.

BRIEF DESCRIPTION OF THE DRAWINGS

The above-mentioned implementations are further described herein with reference to the accompanying figures. It should be noted that the description and figures relate to exemplary embodiments and should not be construed as a limitation to the present disclosure. It is also to be understood that various arrangements may be devised that, although not explicitly described or shown herein, embody the principles of the present disclosure. Moreover, all statements herein reciting principles, aspects, and embodiments of the present disclosure, as well as specific examples, are intended to encompass equivalents thereof.

FIG. 1 illustrates a method for creating a computer-implemented application, according to embodiments of the present disclosure.

DETAILED DESCRIPTION

Figure 2:
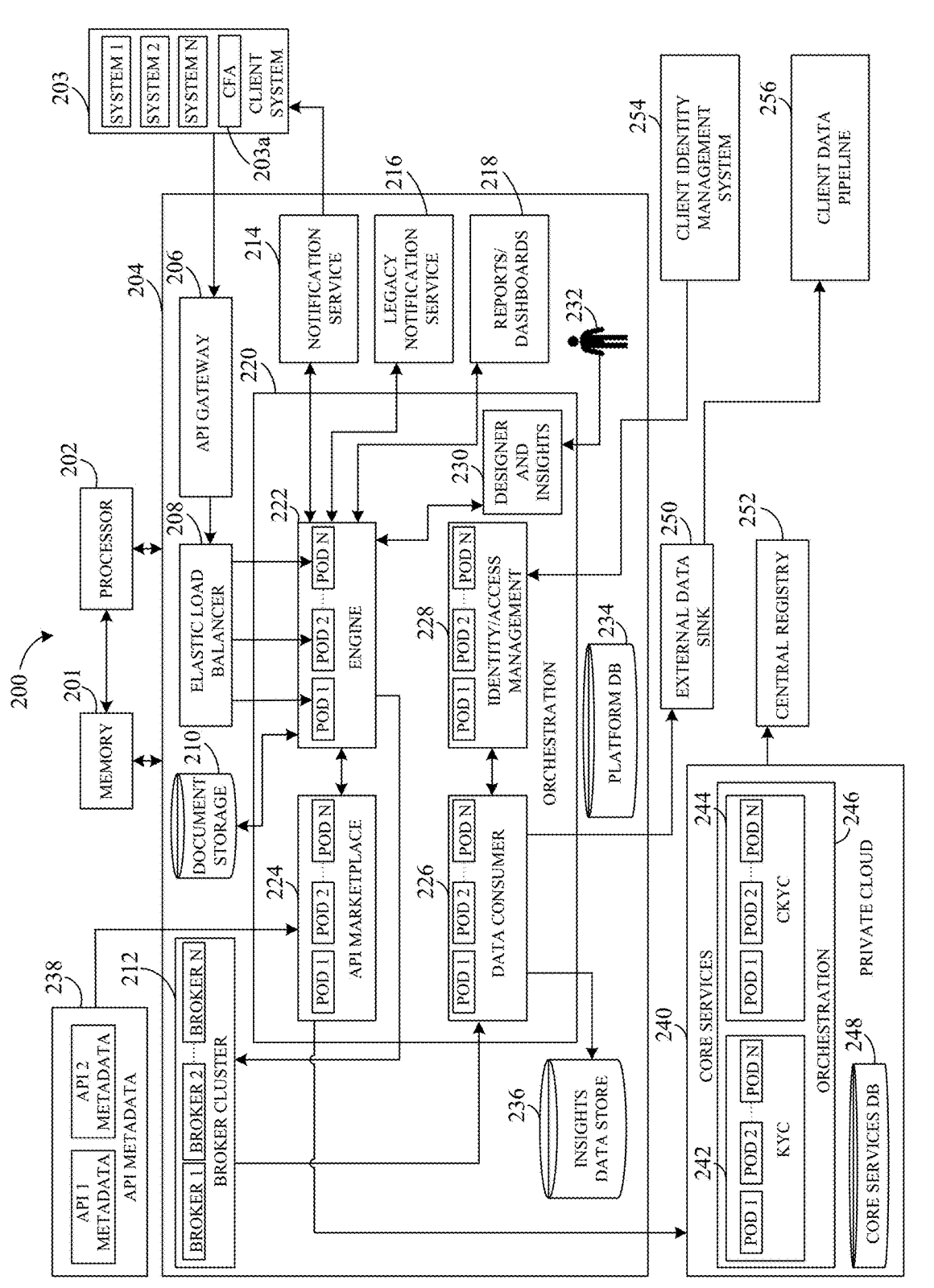
FIG. 2 illustrates a customized application development and management system (CADMS) for creating and managing the computer-implemented application, according to embodiments of the present disclosure.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures or methods associated with software application development have not been shown or described in detail to avoid unnecessarily obscuring descriptions of the embodiments.

Unless the context indicates otherwise, throughout the specification and claims which follow, the word "comprise" and variations thereof, such as, "comprises" and "comprising" are to be construed in an open, inclusive sense that is as "including, but not limited to." Further, the terms "first," "second," and similar indicators of the sequence are to be construed as interchangeable unless the context clearly dictates otherwise.

Reference throughout this specification to "one aspect" or "an aspect" means that a particular feature, structure or characteristic described in connection with an embodiment is included in at least one aspect. Thus, the appearances of the phrases "in one aspect" or "in an aspect" in various places throughout this specification are not necessarily all referring to the same embodiment. Furthermore, the particular features, structures, or characteristics may be combined in any suitable manner in one or more aspects.

As used in this specification and the appended claims, the singular forms "a," "an," and "the" include plural referents unless the content clearly dictates otherwise. It should also be noted that the term "or" is generally employed in its broadest sense, that is, as meaning "and/or" unless the content clearly dictates otherwise.

The current technology is a system or platform that provides end-to-end solutions for the development of custom applications without a need for a backend application to orchestrate any journey or custom applications. Further, the current technology does not require wrappers or custom code development for each application that utilizes similar components or elements of the platform. The system or platform includes multiple components, which support integration of microservices or application programming interfaces (APIs) with segregated responsibilities of individual stakeholders. The stakeholders include, without limitation, business analysts, frontend engineers, product managers, API designers, and testing engineers such as quality analysis engineers, Development and Operations (DevOps) engineers.

With the current technology, code may be written for the microservices, which could then be used in a plug-and-play mechanism for developing different custom applications without writing an application code specific to the custom application. Further, the current technology supports orchestration or coordinating execution of disparate services of the microservices and uses the services as anchor points, thereby avoiding writing code to realize custom applications. The current technology also reduces the requirement of an engineer to develop and maintain custom applications. The current technology supports integration of basic units including, but not limited to: user interfaces and APIs, in the plug-and-play mechanism such that modifications or updates to any of the basic units would have a minimal impact on the other basic units. With such an integration, the basic units or components of the computing apparatus communicate seamlessly with each other.

The system or platform demarcates different systems that allows all users to work independently on respective systems without waiting for inputs from the other different systems. The system or platform provides Low Code No Code (LCNC) capability to developers for developing one or more custom applications. The system or platform provides interactive and headless applications while maintaining clear segregation of responsibilities like frontend, business journey definitions (workflows), business rules, and cloud API/services offerings. The segregation is achieved due to the individual capabilities of each of the vertices to perform tasks. A user task can be rendered using a renderer or can be rendered on a custom application screen. A service task allows the configuration of one or more services available in a marketplace. The system or platform supports a unified authentication mechanism allowing businesses or clients to configure authentication logic directly via the workflows. Stages or steps of the system or platform support data discoverability that is useful for the generation of analytics and error detection.

FIG. 1 illustrates a method 100 for creating a computer-implemented application based on a directed graph, according to embodiments of the present disclosure. In an embodiment, the method 100 is executed by a computing apparatus that includes a processor and a memory. The memory stores instructions that are executed by the processor to configure the computing apparatus to perform a workflow represented by the directed graph. Although the example method 100 depicts a particular sequence of operations, the sequence may be altered without departing from the scope of the present disclosure. For example, some of the operations depicted may be performed in parallel or in a different sequence that does not materially affect functioning of the method 100. In other examples, different components of an example device or system that implements the method 100 may perform functions at substantially the same time or in a specific sequence.

The method 100 begins at block 102 by providing the directed graph having vertices and directed edges that connect respective pairs of the vertices. The directed graph represents a workflow, the vertices are associated with respective predefined tasks in the workflow and the directed edges represent transitions or dataflow between the predefined tasks. The vertices are respectively assigned symbols from a palette of symbols. The workflow is a pictorial version of a process that corresponds with the directed graph, which can be manipulated by a developer or a user in real-time. The workflow can be designed by dragging and dropping elements or components, such as the vertices and the edges, for building or developing the workflow without writing code. The vertices of the workflow may be configured for different kinds of tasks by users including, without limitation, a business analyst, and product manager. The vertices of the workflow are also referred to as nodes.

The computer-implemented application is a custom application developed for a particular process. In some embodiments, the workflow can be designed based on sub-workflows which are portions of the process. The sub-workflows may be executed through the workflow, thereby making the workflow and the sub-workflows reusable. Thus, the usage of sub-workflows for designing or building any process supports reusability and scalability. Further, using sub-workflows can reduce the time to market for any custom application.

Each of the assigned symbols is associated with a corresponding predefined task of the predefined tasks and one or more symbols corresponding to the service task are associated with one or more Application Programming Interfaces (APIs) in an API-marketplace (API-MP). The predefined tasks associated with the vertices include one or more of a timers task, a service task, or a user task. In some embodiments, the predefined tasks associated with the vertices further include one or more of business rule task, sub-process, event task, and the like. At block 104, the method 100 includes modifying the predefined tasks based on parameters received from a developer to customize implementations of the predefined tasks. In some embodiments, the workflow corresponds to Business Process Model and Notation (BPMN) and each activity is considered as a task of the predefined tasks. For example, Camunda Modeler may be used for designing the workflows.

At block 106, the method 100 includes retrieving APIs that implement the predefined tasks, which may be modified based on parameters received from a developer to customize implementations of the predefined tasks. In some embodiments, the parameters received from the user are inputs including, without limitation, values and instructions, which can be used to modify the predefined tasks in the workflow. Also, the APIs are retrieved for implementing the predefined tasks, without requiring a separate middleware or a user interface (UI). The retrieval of the APIs is achieved by selecting the APIs via interactions with an external cloud service API. For selecting the APIs, the APIs are listed in the API-MP and the APIs are selected in accordance with a definition of the predefined tasks corresponding to the respective vertices. The inputs and outputs of the selected APIs are then bound to variables in the workflow. The retrieval of the APIs that implement the predefined tasks is performed by selecting an API from the one or more APIs associated with the assigned symbol at the respective vertex.

At block 108, the method 100 includes integrating the APIs using a workflow orchestration engine (WOE) to provide executable instructions, which on being executed by the processor, perform the workflow represented by the directed graph. The integration of the APIs is supported by mapping of API inputs and outputs. The WOE coordinates rendering of the UI by a renderer, which comprises a frontend library or a renderer library, to receive input data. The WOE further coordinates publishing granular events at a broker or a broker cluster. The granular events are information generated during the execution of the workflow by the WOE. Also, a state transition in the workflow leads to an event that translates to a granular event. Each state emits data with a data payload and produces information on time spent for each task or activity. A data consumer consumes the granular events, and the data consumed at the data consumer is directed to a data sink based on coordination of the WOE.

The workflow is executed by the WOE, which interacts with the API-MP to send the variables of the workflow as inputs in calls to the APIs and binding outputs to the variables of the workflow. For receiving input from a user of the executable instructions, the user task may include a form with a field, and the form includes customizable settings. In certain non-limiting examples, the form can be generated based on reconstruction of a schema and rendered on a user interface, the schema being reconstructed by a renderer library during execution of a step of the workflow. The method 100 further includes monitoring the execution of the executable instructions to generate performance data and storing the performance data on a memory. In some embodiments, the memory may be external to the computing apparatus, which is accessible over wired or wireless networks. The memory may be a non-transitory storage medium or may be implemented in a number of ways, such as but not limited to, volatile memories, Non-Volatile Memories (NVM), Read-Only Memories (ROM), Random Access Memories (RAM), magnetic disk storage media, optical storage media, smart cards, flash memory devices, any combination thereof, and the like.

FIG. 2 illustrates a customized application development and management system (CADMS) 200 for creating and managing a computer-implemented application or a custom application, according to embodiments of the present disclosure. FIG. 2 is described in conjunction with the previous figure. The CADMS 200, also referred to as the computing apparatus, is configured to perform the workflow represented by the directed graph corresponding to the computer-implemented application. The CADMS 200 includes a memory 201 for storing instructions corresponding to the CADMS 200 and a processor 202 that executes the instructions stored in the memory 201, similar to the memory and processor as described in FIG. 1. The CADMS 200 further includes a development and management device (DMD) 204 that comprises one or more blocks such an API gateway 206, an elastic load balancer 208, a document storage 210, and an insights data store 236. The CADMS 200 further includes a notification service block 214, a legacy notification service block 216, a reports-and-dashboards block 218, a platform-components block 220, and a platform database (DB) 234.

The platform components block 220 may include a container orchestration system that includes components such as a workflow orchestration engine (WOE) 222, an API marketplace 224, a data consumer 226, an identity/access management component 228, and a designer-and-insights component 230. The platform components block 220 is, for example, Kuberneters™. The one or more components of the platform components block 220 interact with at least one or more blocks of the DMD 204 to create the computer-implemented applications. The DMD 204, in some embodiments, is hosted on a private cloud, for example, Amazon Web Services (AWS)® Private cloud. The DMD 204 is communicatively coupled to a client system 203 that includes one or more systems, such as system 1, system 2, and system N, and a Client Frontend Application (CFA) 203a. Each system of the client system 203 includes the renderer, as described in FIG. 1, that comprises the frontend library, which allows a user (e.g., a user of the client system 203) to build at least user/business journeys orchestrated by workflows and forms.

The frontend library is built using React that may be embedded in the client system 203 to drive the business journeys using the workflows for orchestration. The renderer provides the CFA 203a for the client system 203, allowing the user to perform actions that include, but are not limited to, submission of requests or updates and accessing forms. In some embodiments, the user may be a client corresponding to the client system 203 or an end user of the custom application related to the client system 203. The renderer offers vernacular support where a UI corresponding to the CFA 203a that is rendered at the client system 203 can be configured to be provided in one or more languages. In some embodiments, the UI is rendered by renderer for each workflow for cases in which a user task is attached with a form. The UI is an outcome of the execution of the workflow for the cases in which the user task is attached with the form. In some embodiments, the rendered UI also supports text to speech conversion feature. In some embodiments, the renderer can render or automatically adjust one or more forms, or the UIs corresponding to the CFA 203a based on the type of device or screen size of the device, such as a mobile or desktop.

The client of the client system 203, in some embodiments, is capable of modifying, for example, a form, and based on the modification, the CADMS 200 generates a code corresponding to the modification, without any manual intervention. The CFA 203a also supports attaching forms. The usage of the renderer by the client system 203 has the benefit that to the additional step of setting up the UI as a separate component or system can be omitted. In some embodiments, the UIs corresponding to the CFA 203a can be customized based on one or more requirements of the client. In some embodiments, if desired, the client system 203 may use a custom or proprietary UI. The CADMS 200 supports integration of the proprietary UI with existing components of the CADMS 200, such as the DMD 204. In an event when linked API execution results in an error/exception, CADMS 200 supports the ability to determine where the error/exception occurred in the workflow, resulting in the workflow becoming stuck. Further, the CADMS 200 supports the ability to manually or automatically retry the error/exception condition. For example, retrying the error/exception condition can be used to determine whether the issue has been resolved. These abilities supported by the CADMS 200 have the benefit of more rapidly surfacing errors/exceptions and providing a faster workflow for resolving such issues once they are surfaced.

The renderer includes three rendering modes. A first rendering mode is a form-based rendering mode that allows a developer 232 to visually design a form by dragging and dropping common form elements and aligning the common form elements. In some embodiments, the developer 232 may be the client of the client system 203. The common form elements include textboxes, dropdowns, and checkboxes. A visual representation of the designed form is a schema of forms that is a blueprint for the renderer to decide which elements are required to be rendered on a screen of the device. The CADMS 200 allows the developer 232 to save the schema as a draft and attach the saved schema onto a step or a vertex of the workflow by selecting from a visual list of pre-created draft forms. During execution of the step of the workflow or at runtime, the renderer library reconstructs the schema into the form and renders the form on the UI. The rendering allows the users, such as the clients, to dynamically generate user interfaces with comparatively lesser effort in coding for the UI. Further, the form may be modified and deployed to the custom application or the workflow without modifying the custom application, reducing the time to market for the custom application.

A second rendering mode, also referred to as an app-screen mode, is intended for complicated user interfaces. The app-screen mode may be used by the developer 232 or the user when a step or vertex in the workflow represents a screen or a page that includes complex interactions and styling requirements. The screen or page is created by the developer 232 that may be used by an end user. The app-screen mode allows the developer 232 to provide a custom built React component that the CADMS 200 renders when the user reaches the corresponding step. The app-screen mode allows the developer 232 to work on the frontend screen in addition to analysing how the frontend screen interacts with other screens of the custom application or how a global user state is managed. The app-screen mode allows controlled execution, orchestration, and state management and complete UI customizability.

A third rendering mode, which can be referred to as an external-URL mode, may be used by the developer 232 to display a third-party website into the workflow. The usage of the external-URL mode supports integrating one or more external services, such as payment gateways, into the UI provided by the CFA 203a. The external-URL mode thereby makes user experience seamless without being directed to an external location.

The client system 203 sends an initial request to the WOE 222, henceforth abbreviated as the engine 222, to initiate the workflow corresponding to the custom application through the API gateway 206 and the elastic load balancer 208. In some embodiments, the engine 222 is a fleet of servers on a cloud infrastructure that execute the workflows designed by the developer 232.

In some embodiments, the client system 203 may send updates to the engine 222 through the API gateway 206 and the elastic load balancer 208. Further, if the client system 203 provides documents related to the initial request or updates, the engine 222 stores the received document in the document storage 210, for example, Amazon S3™. In some embodiments, the initial request includes a client system identifier (ID), also referred to as client ID that is utilized for sending update notifications or the initial request to access the custom application, as needed.

The API gateway 206 is a single-entry point that may be, without limitation, configured in accordance with rate limiting, Cross-Origin Resource Sharing (CORS) setup, and Open API specification. For example, the API gateway 206 includes, but is not limited to, an Amazon API gateway and Apigee API gateway. Further, the API gateway 206 may be a public API gateway or a private API gateway. The API gateway 206 interacts with the elastic load balancer 208 upon receiving the initial request or the update for forwarding to the engine 222.

The elastic load balancer 208 efficiently distributes and directs the incoming one or more initial requests or updates to the engine 222, more specifically to one or more pods of the engine 222. The engine 222 is a component that automatically manages and executes workflows corresponding to the custom application. For example, the engine 222 may include one or more features of Apache Airflow™, AWS step Functions™, Azure Logic Apps, or Google composer. In some embodiments, the engine 222 may be Java Spring, workflow executor. The engine 222 may, in some embodiments, perform deduplication where the engine 222 is capable of identifying a single instance of each request or update. The engine 222 may identify the single instance of each request or update based on differences in metadata structure of the request or update, The differences, for example, may be minor or substantial. Also, the engine 222 identifies property, such as idempotency, of certain operations of the workflow that can be applied multiple times without changing result beyond the initial application. The engine 222 eliminates a necessity to write multiple codes for integrating the services and the APIs by utilizing the workflow to bind the input and output and for calling the APIs, and the engine 222 also eliminates a necessity to write wrappers.

The developer 232 utilizes the designer-and-insights component 230 to create the workflow for the custom application. Prior to receiving the initial request from the client system 203 to initiate the workflow, the developer 232 uses the designer-and-insights component 230 to create the corresponding workflow. The designer-and-insights component 230 includes a workflow creation interface that the developer 232 uses to create or modify the workflow of the custom application prior to or during the deployment of the custom application. The renderer library of the renderer corresponding to the CADMS 200 renders one or more tasks or stages of the workflow previously designed and deployed. On the other end, the renderer library supports customizability based on the user (e.g., the client of the client system 203) by supporting Cascading Style Sheet (CSS), different types of forms, and custom screens, without limitation.

The developer 232 creates the directed graph, that represents the workflows, using vertices and directed edges that connect respective pairs of vertices. The vertices are associated with respective predefined tasks in the workflow, and the directed edges represent transitions or dataflow between the predefined tasks. The predefined tasks include one or more of timers task, service task, or user task. The user task includes a task that requires inputs from a user. The timer task includes tasks that correspond with the timing of execution of any process, sub-process, or any other task. The vertices of the directed graph are respectively assigned symbols from a palette of symbols. Each of the symbols is associated with a corresponding predefined task. The predefined tasks may also be modified based on the parameters received from the developer 232 to customize implementations of the predefined tasks. In some embodiments, the workflow is wired up such that data, such as one or more inputs to the workflow, may be provided from an external side, such as the client system 203, or may be from the components of the CADMS 200.

Further, the developer 232 may create the workflow using a waterfall mechanism that provides multiple options or paths in the workflow to perform at least a portion of the process of the workflow, that is a sub-process. Based on real-time or runtime decisions and inputs, the multiple options or paths of the workflow can be considered or utilized by the engine 222. By choosing different paths, different APIs can be accessed or called. The usage of the waterfall mechanism, thus, provides flexibility to the developer 232 during the development and execution of the custom application. In some embodiments, the developer 232 may create a custom React content component that may be used as an option for the waterfall mechanism. In some embodiments, the client or the developer 232 may utilize a UI screen corresponding to the custom React content component to view or identify variables and state information of a particular user, such as a client of the client system 203, during the orchestration by the engine 222.

In some embodiments, when the workflow, a form, or a decision matrix is moved from a development/testing environment to a live/production environment, the CADMS 200 enforces a protocol. The developer 232 designs workflows and tests corresponding functionality of the workflow including integration and interaction with the UI corresponding to the client system 203 and the associated APIs. Upon satisfaction, the developer 232 promotes the workflow along with all related resources like other workflows, forms, and decisions to a production environment. The developer 232 places a promotion request for the workflow and related resources. The CADMS 200 then collects the related resources and provides to (or stores in) a repository, such as a global information tracker (GIT) repository. The CADMS 200 generates a link that may be sent to a designated approver, who can approve changes being promoted. On receiving an approval, the changes may be available for deployment into the production environment. The developer 232 may deploy the changes. The workflows and related resources are treated in a way similar to a piece of software and are subjected to the same levels of software development lifecycle (SDLC) patterns to minimize accidental or unintended changes being pushed to production. Additionally, since the resources are stored in the GIT repository, processes such as audits and ability to revert to any previous historical version of the workflow, and related resources are supported.

Further, the created workflows or received requests, such as initial request or promotion request, may be monitored by the developer 232 for creating or modifying one or more components of the workflow, such as at least one or more vertices or edges, that allows the custom application to be up to date. The ability to create workflows and modify the one or more components of the workflow is due to the ease of replication of processes and modifying definition corresponding to the custom application. In some embodiments, the developer 232 configures or modifies the one or more components of the workflow using a configuration form that includes one or more relevant fields corresponding to the elements. In some embodiments, the developer 232 may view details of users, such as the clients or the end users, accessing the workflow. The engine 222 deploys resources such as the workflows, forms, and decision tables, and executes the workflows. Based on the predefined tasks assigned to the vertices of the workflow, the engine 222 retrieves one or more relevant APIs to implement the predefined tasks.

The APIs that are retrieved to implement the predefined tasks are independently implementable without requiring a separate middleware or a separate UI. In some embodiments, the decision table may be used for defining outputs for a set of inputs. Each row in the decision table includes a series of inputs corresponding to a series of variables. The decision table indicates that if the series of inputs match a series of variables, then the CADMS 200 should provide an output as specified in the decision table. In some embodiments, the decision table may be linked to the workflow of the custom application or a consumer.

The retrieval of the APIs is performed by selecting, for a given vertex of the directed graph, an API based on the symbol associated with the given vertex. The engine 222 interacts with the API-MP 224 during the execution of the workflow and sends values as input values while calling the relevant one or more APIs and binds output values to variables of the workflow. By binding, the engine 222 wires up microservices corresponding to the one or more relevant APIs for integrating the microservices to ensure that the custom application works in an error free or accurate way. In some embodiments, the engine 222 communicates with the relevant one or more APIs directly instead of utilizing any middleware. The API-MP 224 receives information related to the relevant one or more APIs and maintains a list of the APIs that the workflow of the custom application may utilize. The API-MP 224, in some embodiments, is a gateway through which one or more APIs, which are invoked from the workflow, are routed. The API-MP 224 also facilitates the mapping of the workflow variables to the input values and the output values of the APIs into workflow variables.

The CADMS 200 provides a flexible API integration to the API-MP 224. The components of the CADMS 200, such as the API-MP 224, may be integrated or linked with the APIs irrespective of programming languages that are used to implement the one or more APIs. However, the one or more APIs can be adhered to a standard such as a Representation State Transfer (REST) protocol. The flexibility allows the developer 232 to map variables of the workflow to input values of an API of the one or more APIs in a structure based on the API's requirement. The flexibility further allows the developer 232 to map specific fields from output values of the APIs to the variables in the workflow.

For example, a vertex of the workflow may be associated with a service task, the execution of the service task relates to the execution of an operation or function via an API specified by the Open API specification. Other vertices of the workflow may use any API linked to the API-MP 224.

The API gateway 206 provides the Open API specification for each API configured on the API gateway 206. Each of the APIs may be attached to a compute service, such as Lambda, that contains logic that enables the developer 232 to define a desired level of granularity for exposing functionality of the custom application.

With the Open API specification, the API may be used by the workflow by configuring the API through the API-MP 224. The use of the API along with Open API specification avoids involving a developer because the API-MP 224 allows binding of the input and output values and automatically abstracts data type information. The API can be configured by individuals including, but not limited to, a business analyst, a product manager, and a tester. For example, upon detecting a service task corresponding to a vertex of the workflow, the engine 222 makes an API call using a mapped or bound input value or variable. On successful execution, the engine 222 binds output values from the API to the variables corresponding to the workflow. The engine 222 accesses the API-MP 224 each time the engine 222 or the user reaches a step in the workflow that uses an API that is linked to the API-MP 224. Upon linking the APIs to the API-MP 224, the workflow would carry one or more variables that are bound as the input values and upon calling the APIs or the services, the API-MP 224 may bind the output values from the API or to the variables of the workflow. However, the engine 222 does not access the API-MP 224, if the workflow does not have any step or vertex that requires an API that is linked to the API-MP 224 or if the user directs the execution in a different path.

In some embodiments, orchestration is facilitated by steps such as the interaction of the engine 222 with the API-MP 224, which would conventionally be performed by a code. Additionally or alternatively, orchestration is facilitated by steps such as sending the input values to the API-MP 224 and binding the output values from the API-MP 224 to variables corresponding to the workflow, which would conventionally be performed by a code. The API-MP 224 is a component or module that includes a collection of APIs from different API providers that can be used by the engine 222 while executing the workflow. The API-MP 224 lists all the APIs that could be integrated in the workflow. In some embodiments, the API-MP 224 is an aggregator, similar to an applications store, e.g., business APIs. The API-MP 224 is also the gateway through which the one or more APIs are accessed or invoked corresponding to the workflows and are routed for integration in the workflow. The APIs expose functionalities and data corresponding to the API, which can be accessed and utilized by a developer 232, by the Open API specification.

The input values from the workflow and output values from the APIs are bound to respective variables. Once the APIs required for the application are wired together, the APIs can be repetitively utilized. The APIs published or listed in the API-MP 224 can be browsed, tested, used, and reused for different applications. In some embodiments, one or more documents may be automatically streamed to the APIs. The engine 222 integrates the required APIs to provide executable instructions that perform the workflow represented by the directed graph. The API-MP 224 interacts with cloud service API, also referred to as HTTP API, which may be external or internal to the DMD 204. The cloud service API may be public or private that can be accessed with corresponding credentials by the engine 222 or the DMD 204. For example, a cloud service API may be utilized for Unified Payments Interface (UPI) payment.

The API-MP 224 is communicatively coupled with an API metadata block 238 or a core services block 240, which may be the external cloud service API. The API metadata block 238 includes metadata of different APIs, e.g., metadata that is stored in the GIT repository. The engine 222 identifies a relevant API that can be utilized during the execution of the workflow in accordance with a definition of the predefined tasks corresponding to the respective vertices. The engine 222 identifies a relevant API based on the metadata of the different APIs stored in the GIT repository. For example, the API metadata block 238 includes API 1 metadata and API 2 metadata that comprises but is not limited to a type that links to the open API specification corresponding to an API 1 and API 2.

The core services block 240 includes services that are external to the DMD 204. The engine 222, through the API-MP 224, interacts with the core services block 240. Based on the data from the engine 222, the API-MP 224 determines services used by the engine 222 to complete a step of the workflow. The API-MP 224 access the services of the core services block 240 based on the determination. The input values, output values, and corresponding variables are bound, allowing the services of the core services block 240 to perform processes and provide the output values to the engine 222.

For linking the API-MP 224 with the cloud service APIs, the Open API specification may be utilized such that the cloud service APIs get hosted in API-MP 224 or pointers could be used to point the cloud service API, at the API-MP 224. Upon linking the APIs, such as the cloud service APIs, to the API-MP 224, the cloud service APIs are available for wiring in the workflow. Based on the received data or values from the core services block 240, the engine 222 completes the corresponding step, sub-process, or process of the workflow. The data generated during the execution is provided to the client system 203 and to the broker cluster 212. The core services block 240 performs granular deduplication and decides a subsequent action corresponding to updates or notifications. In some embodiments, various parts are stateless in that they do not preserve reference information about previous operations, and these stateless parts can include the UIs corresponding to the CFA 203a, the designers-and-insights component 230, and the microservices of the core services block 240. The CADMS 200 supports the ability to create and manage stateless components, and the CADMS 200 supports independent creation, management, and duplication of the components of the CADMS 200 along with the plug-and-play functionality.

For example, if the engine 222 receives a loan request, the engine 222 initiates a workflow corresponding to processing of a loan request and sends data corresponding to the loan request to the API-MP 224. The API-MP 224 then determines which services are used and interacts with the core services block 240 to calculate and provide a response to the API-MP 224, and the API-MP 224 performs subsequent steps. The data is then utilized by the engine 222 and the information is sent to the client managing a custom application corresponding to a loan process. The information is then published at the broker cluster 212. In the multiple steps of the workflow, two of the steps corresponding to the loan request perform a Know Your Customer (KYC) process and Central Know Your Customer (CKYC), respectively. The API-MP 224 receives data related to the KYC and CKYC services. The API-MP 224 determines that the core services block 240 includes a KYC services block 242 and a CKYC services block 244 in an orchestration block 246 (e.g., Kubernetes™). The API-MP 224 routes the input values to the KYC services block 242 and the CKYC services block 244. Based on supporting data present in a core services database (DB) block 248, the KYC services block 242 and the CKYC services block 244 perform their respective processes and provide output values to the engine 222 through the API-MP 224.

In another example, during an on-boarding of a customer, the KYC of the customer may be performed initially. The waterfall mechanism may be used in which multiple ways or options to perform the KYC of the customer are provided to ensure a maximum success rate. The customer may be provided with all the options to perform the KYC. The options may include uploading relevant documents, CKYC, offline KYC (OKYC), that is based on a unique identification number such as Aadhaar, or usage of Digilocker. Primarily, an option of physical KYC or digital KYC is provided, if the customer prefers the digital KYC, the CKYC option is provided. However, if the CKYC option fails, the OKYC option is presented and further if the OKYC option fails, then the Digilocker option is provided. Each of the options requires a different API that may be a part of the core services block 240 and services such as the KYC services block 242 and the CKYC services block 244 may be provided as part of the waterfall mechanism. The presence of multiple options results in providing flexibility to the client for supporting a process.

The core services block 240 also provides the output values to a central registry 252, such as the Central Registry of Securitisation Asset Reconstruction and Security Interest of India (CERSAI). Further, if the client system 203 submits a loan request by submitting one or more documents through a custom application, the received documents are stored in the document storage 210.

On executing each step of the workflow, such as invoking the APIs, initiating the workflow, and ending the workflow, the engine 222 generates data. The generated data, also referred to as granular events, is published at a broker cluster 212, for example, Kafka OSS. The granular events may also be referred to as raw data or raw insight. In some embodiments, the developer 232 decides the state of the workflow of the granular event that should be explicitly published. The broker cluster 212, for example, may be manually scaled or automatically scaled based on the generated data that is to be published. The broker cluster 212 may include one or more brokers, such as broker 1, broker 2, broker N, that publish the generated data, which is consumed by the data consumer 226. For example, the data consumer 226 may be a Kafka client which may be a subscriber to the broker cluster 212 and capable of interpreting the data published at the broker cluster 212. In some examples, the data consumer 226 is a Java Spring that offers an environment for robust programming and configuration model for Java-based applications. The data consumer 226 may store the consumed data at a database, such as an insights data store 236 for generating insights and analytics.

Further, the data from the data consumer 226 is directed to an external data sink 250, also referred to as a data sink 250, which is accessible by the user or a client through a client data pipeline 256 for creating customized analytics. For example, the customized analytics may include tracking the status of any assignment performed or being performed by one or more individuals at a stipulated time. Also, the customized analytics may indicate instructions to escalate the current status to another individual or a monitoring system. Also, the customized analytics may include a day-to-day basis report on the work in a desired format. The external data sink 250, for example, is Amazon Kinesis. The external data sink 250 continuously streams workflow events and key business attributes to the clients.

Those clients that are capable of accessing the data from the external data sink 250 are determined based on interactions between a client identity management system 254 and the identity/access management component 228 of the DMD 204. The client identity management system 254, in an embodiment, includes Lightweight Directory Access Protocol (LDAP), active directory, OpenID Connect (OIDC)/AUTH2 system. The identity/access management component 228 of the DMD 204, in an embodiment, includes or supports, but not limited to, OIDC/AUTH2, Java spring, Quarkus™. Through the identity/access management component 228, the CADMS 200 supports built-in customizable authentication with an ability to bridge external authentication providers, such as Keycloak, Azure AD™. The identity/access management component 228 corresponds to an authentication mechanism built on top of and fully compatible with OAUTH2 for defining custom authentication flows.

The identity/access management component 228 may be used for building a framework for implementing unified authentication. Based on the framework for implementing unified authentication, the developer 232 may develop one or more authentication workflows for one or more steps of the workflow of the custom application or for the overall workflow of the custom application. The unified authentication may be implemented by integrating an authentication workflow into an actual workflow of the custom application. In some embodiments, the framework may support the developer 232 to create different custom authentication workflows for different steps, the custom authentication workflows, for example, include but not limited to a username/password, One Time Password (OTP), or performing a fraud check during the username/password entry step.

Further, the engine 222 provides notifications and updates to the client system 203 through at least one of the notification service block 214, legacy notification service block 216, and reports-and-dashboards block 218. The notification service block 214, for example, is AWS® Simple Notification Service (SNS). The reports-and-dashboards block 218 provides the analytics related to the granular events either as a document or through visualizations. In some embodiments, the reports-and-dashboards block 218 may receive data within the workflow, a user creating an external UI may access the data or the granular events and create tailored approaches and dashboards. In some embodiments, the data from the reports-and-dashboards block 218 may be provided to the client data pipeline 256. The analytics including reports and dashboards can be created using multiple data points that include a data point through the external data sink 250 and a data point corresponding to the runtime of the workflow. The CADMS 200 also includes platform DB 234 which includes metadata, keys, generated executable instructions, or any information related to the CADMS 200. The platform DB 234, in some embodiments, stores information corresponding to the stateless UI and microservices, since the platform DB 234 is stateful and has a persistent storage.

The CADMS 200 can have an integrated DMS, which caters to various use cases in which one or more documents are involved. The CADMS 200 natively supports or is integrated with the DMS. The DMS allows the developer 232 to indicate specific steps in the workflow as a document management step and to specify a document management action that the developer 232 expects the user (e.g., an end user or client) to perform on reaching the document management step. The document management actions include, without limitation, "upload," "retrieve," "grant access," and "revoke access." In some embodiments, the developer 232 creates a document management step in the workflow for the upload document management action. The creation of the upload document management action serves as an instruction for a frontend web application rendered by the renderer to present to the user, a UI element for uploading one or more documents. The frontend web application, in some embodiments, is the UI provided by the CFA 203*a* or is a part of the CFA 203*a*. For some embodiments, the frontend web application and CFA 203*a* may be synonymously used. The documents, for example, passport copies, personal identification document copies, or address proofs, are then stored in at least one of, but not limited to, the document storage 210 or platform DB 234. The documents are assigned a unique document ID for future use.

Further the document management actions such as retrieve, grant access, and revoke access may use the unique document ID to perform the corresponding document management actions. For example, the integrated DMS may be used to create a workflow or an account opening application where a bank may receive an account opening request and collect basic details from customers who choose to open an account. The DMS may support the customer in opening the bank account. In the upload document management action, the DMS supports and instructs the frontend web application of the CFA 203*a* to request the customer to submit an identity proof document. Further, the DMS supports the grant access document management action to grant read-only access to the document to a document-verification team. When the document-verification team prefers to verify the uploaded document, the retrieve document management action can be used to retrieve the document based on the corresponding unique document ID. The retrieved documents may be presented to the document-verification team so that the document-verification team can approve or reject the account opening request. Thus, the integrated DMS allows the developer 232 to integrate document-based actions into the workflow without any awareness corresponding to storage location, access status, or retrieval status, and without a necessity of a code to integrate document-based actions into the workflow.

For example, in a lending process, if an end user is required to provide a bank statement or an enterprise establishment proof, the end user should be able to upload one or more documents in real-time during the lending process, or offline via a customer executive. The support for the DMS is provided within the workflow designed by the developer 232, or the renderer, or via integration of an external API. For uploading the relevant documents, the renderer supports the end user to upload during the lending process. In a situation where the relevant documents are uploaded in a different process, the external API may be used and the relevant documents may be uploaded to the DMS via an integration end point directly into the workflow. In an instance where the relevant documents may be accessed through a URL, the accessed relevant documents may be uploaded into the DMS. In some embodiments, the visual mapping of the API inputs and outputs are integrated with the DMS.

For retrieving any documents from the DMS, metadata corresponding to the documents, or any process, is obtained by the renderer in real-time and rendered. The metadata is assigned to the documents at an instance of registering the documents. Alternatively, for retrieving the documents from the DMS, the engine 222 executes corresponding instructions of the workflow for fetching documents, the documents are fetched in byte-stream & passed over API. The documents from the DMS can also be fetched via an external API, such as services of the core services block 240. In some embodiments, the DMS supports document processing to handle cases such as compression, for example, reducing the size of the document or merging of documents. The merging of documents includes, for example, merging two pages of a document into one. In some embodiments, the CADMS 200 allows customizations in terms of addition or deletion of the components of the CADMS 200.

The CADMS 200 includes multiple features that ensure that the workflow operates in a desired manner. The features include an integrated development environment (IDE), such as the designer-and-insights component 230 and the CFA 203*a*. The designer-and-insights component 230 and the CFA 203*a* allows the users to configure services available in the API-MP 224 by trying or testing, binding the inputs or output values, designing forms, mapping the designed forms in the workflow, and configuring a decision table to utilize in the workflow. The features further include validating the workflow for error identification and debugging when the developer 232 decides to deploy the workflow to the engine 222. Validating the workflow includes validating that:

the forms required by the workflow are deployed,
 the decision tables required by the workflow are deployed, and
 any child workflows, invoked from the deployed workflow, are deployed.
 the workflow has a key defined that uniquely identifies the workflow,
 the external data sink 250 has been configured for the custom application, if the corresponding workflow is configured to publish the data to the external data sink 250.

Validating the workflow further includes different validations specific to sub-workflows or workflows specific to the identity/access management component 228, also referred to as unified authenticator 228, and token retrieval.

The validations corresponding to the workflow may be a part of the SDLC of the custom applications. The SDLC of the custom applications of the CADMS 200 is comparatively faster compared to SDLC of applications of the conventional system. The CADMS 200 supports a user to build a custom application by providing end-to-end solutions for the development of the custom application. For example, a user, such as a business analyst or the client may interact with an end user to create a draft workflow and indicate steps where the workflow requires documents or any user inputs. The client may build on top of the draft workflow and specify input and output parameters at steps where one or more APIs are to be invoked. In some embodiments, the input and output parameters may be specified even if the APIs do not currently exist. For any APIs that are required to invoked by frontend, one or more stub service tasks may be added with the input or output parameters and return mocked values that the client may use to develop a frontend for the custom application. The CADMS 200 manages authentication, load-balancing, auto-scaling, and other processes upon invoking the APIs. Furthermore, the stub service tasks or APIs can be created in such a way that the stub service task returns mock responses, which have same structure as actual expected responses. The stub API may be swapped with an actual API upon availability. Further, the renderer may be embedded onto a frontend code repository and may test the workflow for pre-emptively identifying errors. Thus, the complete custom application may be created without introduction of any downtime caused due to inclusion of multiple teams for development of partial portions of the complete custom application.

Figure 3:
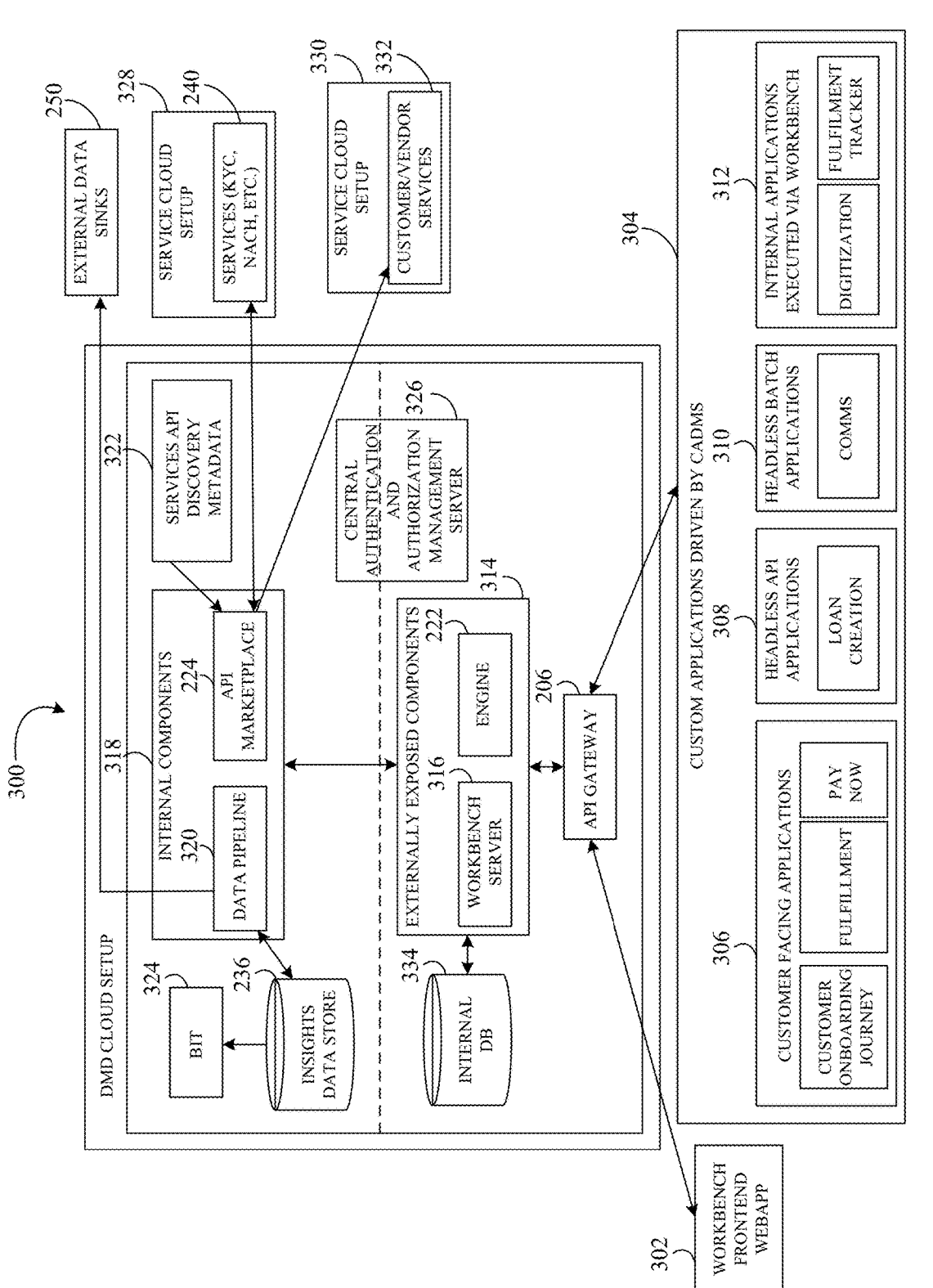
FIG. 3 illustrates a development and management device cloud setup, according to embodiments of the present disclosure.

FIG. 3 illustrates a DMD cloud setup 300, according to embodiments of the present disclosure. FIG. 3 is described in conjunction with the previous figures. The DMD cloud setup 300 includes an externally-exposed-components block 314 that comprises a workbench server 316 and the engine 222. The externally-exposed-components block 314 inter- acts with a workbench frontend web application 302. In some embodiments, the workbench frontend web application 302 includes a workflow creation interface similar to the workflow creation interface of the designer-and-insights component 230. The developer 232 may utilize the work- bench frontend web application 302, also referred to as workbench frontend webapp 302, to design and deploy workflows, forms, and decisions, or to receive any input data. In some embodiments, the client of the client system 203 may utilize the workbench frontend web application 302. The workbench frontend webapp 302 includes an embedded version of the renderer and may be used to initiate one-off instances of the workflows. In some embodiments, the workbench frontend webapp 302 is an IDE to design the workflow, investigate or debug workflow execution, provide analytics including, but not limited to, a funnel diagram, a heatmap characterization, a design one or more forms, monitoring the workflow, and viewing or constructing deci- sion tables.

The workbench frontend webapp 302 may further be utilized to test at least one of the workflows, forms, and decisions, while and after the workflows, forms, decisions are designed or developed. The developer 232 may utilize the IDE such as the workbench frontend webapp 302 to execute the workflow during the corresponding develop- ment. The renderer embedded into the workbench frontend webapp 302 allows the developer 232 to provide necessary inputs to the workflow and obtain or view a result of an execution of the workflow from an end user's perspective.

The workbench frontend webapp 302 may further be used to trigger processes requiring manual intervention. The workbench frontend webapp 302 provides a tasks screen for viewing tasks assigned to self and acting on the assigned tasks without necessarily building a dedicated user interface.

The workbench frontend webapp 302 further includes an embedded form builder for building screens that allow the developer 232 or the clients of the client system 203, to drag and drop user interface elements for building one or more forms. The one or more forms may be designed and saved as a schema. The workbench frontend webapp 302 config- ures the form for displaying as a user interface, through the renderer. Further, the embedded form builder also supports the addition of metadata for display. Further the workbench frontend webapp 302, in an embodiment, includes a state- of-the-art task screen that displays tasks, which for example, requires manual intervention without a necessity to build a dedicated UI. The state-of-the-art task screen also allows the developer 232 or the clients of the client system 203 to filter the tasks. The state-of-the-art task screen, in some embodi- ments, is responsively rendered on any user device including laptop, desktop, tablet, and mobile phone, without any limitation.

The state-of-the-art task screen allows the developer 232 or the client of the client system 203 to prioritize and filter the tasks using metadata available in the workflow corre- sponding to the custom application. Further, the state-of- the-art task screen allows the tasks to be sorted and assigned and also indicates the task which needs to be acted upon. An interactive user task is generated during the execution of the workflow. The interactive user task may be rendered in multiple devices since the renderer library generates JavaScript Object Notation. (Json) for rendering. In some embodiments, one or more functionalities of the workbench frontend webapp 302 are present in the one or more UIs provided by the CFA 203a. For example, the CFA 203a may provide a UI for form building, as a state-of-the-art task screen.

The renderer library also utilizes the Json for rendering a screen corresponding to the custom application. For example, a form that is designed using an embedded form builder application can capture in Json format each element of the resultant form and the elements' properties. This Json file is then used, e.g., by the renderer library to render the form on the screen. Usage of the renderer library provides flexibility or options to display as per custom application user experience (UX) patterns, thereby reducing overall complexity in terms of resources. The Json that includes "form" definition delegates responsibility to the renderer that provides the look and feel of a corresponding UI. The developer 232 merely provides a container, while a code for the form or user input screen may be automatically gener- ated. In some embodiments, the Json may be used for an entire custom screen or a mix of renderer and a customer screen that may be provided by the CFA 203a. When components corresponding to a form are added, the com- ponents are inturn represented as Json. The Json includes or carries each component, corresponding attributes, and other metadata. The renderer library utilizes the Json to render the form.

The workbench frontend webapp 302 specifically inter- acts with the workbench server 316 through the API gateway 206. The workbench server 316 stores workflows, command decisions, and forms in a draft mode that facilities collabo- ration across one or more developers 232. The workbench server 316 supports custom applications that are driven by CADMS 200, the custom applications driven by CADMS block 304 includes one or more of the custom applications. For example, the custom applications driven by CADMS block 304 include one or more types of the custom appli- cations such as customer facing frontend applications 306, headless API applications 308, headless batch applications 310, and internal applications executed via a workbench 312.

For the customer-facing frontend applications 306, busi- nesses may focus on styling, business specific branding, and user experience whereas features related to user journey orchestration, API invocations, authentication, scaling, and availability are handled by the CADMS 200.

The CADMS 200 may provide data for the frontend corresponding to the custom applications built using CADMS 200. Upon detecting an increase in traffic to the custom application, the CADMS 200 automatically scales horizontally across different availability zones. Regarding detecting increase in the traffic, the CADMS 200 creates one or more replicas of itself and routes the traffic evenly between the one or more replicas and balances the traffic based on availability. The creation of the one or more replicas and routing the traffic evenly between the one or more replicas protect corresponding API servers from surge of the traffic. The creation of the one or more replicas and routing the traffic leads to a reduction of traffic that the single APIs or the API servers would handle. However, if the traffic reaches a level that overwhelms the APIs or the API servers, then the workflow may be altered. The alteration may result in routing excess traffic to a different API or API server that is capable of handling the excess traffic, based on a logic. In some embodiments, a step on the workflow may be created manually or automatically to display a generic message, for example, "your request has been received and will be processed shortly," thus bypassing the API invocation completely or bypassing codes corresponding to the frontend or DevOps involvement.

For example, the customer-facing frontend applications 306 include the customer onboarding journey application, fulfillment application, and payment application, also referred to as pay now application. The CADMS 200 supports workflows, which do not need any user input or interaction beyond an initial user input. The workflows may be converted into an application that is referred to as the headless API applications 308. For the headless API applications 308 businesses may initiate workflows for corresponding applications by using one or more APIs without any frontend involved. The headless API applications 308 may be used as an API layer to expose business logic to existing workbench frontend web application 302. For example, the headless API applications 308 includes a loan creation application. The interactive and headless applications are obtained or realized by the vertices of the workflow or the directed graph, which are configured for a service task, a timers task, a user task, business-rule-task, send task, receive task or a call-activity task. In some embodiments, the headless applications may accept user tasks without a necessity of a UI to interact with the user task. The user may merely submit inputs to the user task which may be headless too. The service task includes, but not limited to, interacting with the API-MP 224, document-management services, and expression. The document-management services include document related actions such as upload, retrieve, and the like. The expression includes, but not limited to a mathematical expression and string manipulation. The business rule task is a task related to the execution of a decision table or a decision matrix. The send task includes sending messages to any external cloud resources, such as AWS® Simple Notification Service (SNS) and Simple Queue Service (SQS). The receive task includes receiving messages from any of the external cloud resources. The call-activity task includes invoking any child workflows or sub-workflows.

For the headless batch applications 310, scheduled jobs driven by corresponding workflows are run for recurring processes, such as marketing campaigns, and sending reminders to users, automatically. For example, the headless batch applications 310 include applications related to communications. For the internal applications executed via workbench 312, the businesses may provide the applications that need not expose the business logic. The workbench frontend webapp 302 executes internal applications by utilizing the renderer and without the necessity of a specialized UI. For example, the internal applications executed via workbench 312 include, without limitation, digitization, fulfillment tracker, employee leave application approvals, and travel reimbursement processing. The internal applications executed via workbench 312 may include UIs with bare minimum information and without at least stylistic customizations and modifications corresponding to any clients.

Based on the initiation of the workflow corresponding to one of the custom applications, the engine 222 executes the steps of the workflow. The engine 222 accordingly interacts with the API-MP 224, which further interacts with a services API discovery metadata block 322. In an embodiment, the services API discovery metadata block 322 includes metadata related to API requirements of the workflow and also metadata related to APIs that are offered by the services of the core services block 240 of a corresponding service cloud setup block 328. The metadata present in the services API discovery metadata block 322 supports discoverability of a relevant service from an API source or the core services block 240. The service cloud setup 328 includes setup information for configuring the core services block 240 for communicating with the API-MP 224. The communication between the API-MP 224 and the core services block 240, in an embodiment, is through Virtual Private Cloud (VPC) peering, for example, Google Cloud VPC Network Peering.

The APIs, that adhere to a standard protocol, may be discoverable via an Open API specification. Through the services API discovery metadata block 322, the CADMS 200 systematically discovers exposed APIs, and the CADMS 200 ascertains contract of inputs expected by the APIs and contract of outputs from the APIs. The developer 232 receives a list of discovered APIs that the developer 232 may click to view expected inputs and outputs and work with the discovered APIs within the CADMS 200.

The services API discovery metadata block 322, in an embodiment, includes a GIT repository with the above-mentioned metadata stored for audit purposes. In some embodiments, the GIT repository may be similar to the GIT repository described in FIG. 2. The documents, provided by the user or the developer 232, related to a request or updates corresponding to the workflow, are stored in an internal database (DB) 334. By storing the documents, workflow definition and details corresponding to the execution of the workflow are stored in the Internal DB 334. In some embodiments, the platform DB 234 includes the internal DB 334. In some embodiments, the platform DB 234 is similar to the internal DB 334. The API-MP 224 also interacts with a customer/vendor services block 332 of a service cloud setup 330. The service cloud setup 330 includes setup information for configuring the customer/vendor services block 332 for communicating with the API-MP 224. The customer/vendor services block 332 includes customer/vendor services or APIs that the client or the user prefers to integrate with the workflow. The customer/vendor services may, in some embodiments, be private or exclusive to one or more clients of the client system 203. In some embodiments, when an API is onboarded, the CADMS 200 scans Open API specification of the corresponding API and derives relevant information. Based on the derived information, the CADMS 200 determines that the API is compatible with inputs and outputs corresponding to the workflow and parameters corresponding to the predefined tasks.

Further, the generated granular events are stored in the insights data store 236, also referred to as a storage-internal 236, for generating insights and analytics through a data pipeline 320. In some embodiments, the broker cluster 212 and the data consumer 226 are collectively referred to as the data pipeline 320. For example, a system insight is derived based on the granular events stored in the insights data store 236. The system insight includes information regarding the time taken by each step or time taken by each API/task of the workflow during execution of the corresponding workflow.

The stored granular events are then provided to a business intelligence tool (BIT) 324 for analyzing data from a variety of data destinations and sources, such as the components of the DMD 204, core services block 240. In some embodiments, the BIT 324 is similar to the insights data store 236. The data pipeline 320 also shares the granular events with the external data sink 250. The granular events shared with the external data sink is accessible to the clients of the client system 203 through, in some embodiments, the client data pipeline 256 for creating customized analytics. The access to the custom applications driven by CADMS 200, services corresponding to the core services block 240, and services corresponding to the customer/vendor services block 332 for the clients of the client system 203 or developer 232 are managed by the central authentication and authorization management server 326. In some embodiments, the central authentication and authorization management server 326 supports the identity/access management component 228 for creating the framework for unified authentication and management of the unified authentication.

During the course of the execution of the workflow or an end user's journey, multiple state transitions exist, leading to the generation of multiple variables as a by-product. The CADMS 200 allows the developer 232 to indicate within the workflows regarding preferences of the developer 232 related to attributes corresponding to the variables or function of at least the vertices of the workflow. The CADMS 200 transparently streams the information related to at least the variables, to the internal DB 334 or insights data store 236. By segregating the various information, the CADMS 200 exposes the insights or events data for business intelligence allowing the developer 232 to create reports and visualizations and also embed the visualizations as dashboards.

In a conventional approach, a UI or backend is used for storing the data in a database and publishing or copying the data on a need basis. Such an approach increases dependencies on frontend and backend applications and diverts focus from an actual business value proposition. The CADMS 200, on the other hand, utilizes transitions and data generated through directed edges, which are available from event data and used the generated data in real time for the analytics. Further, the granular events and information related to the state of the workflow available on the real-time basis remove dependencies to store or publish the data. Also, utilizing or converting the real-time data into the analytics enables faster decision making for the user, such as the developer 232.

Figure 4:
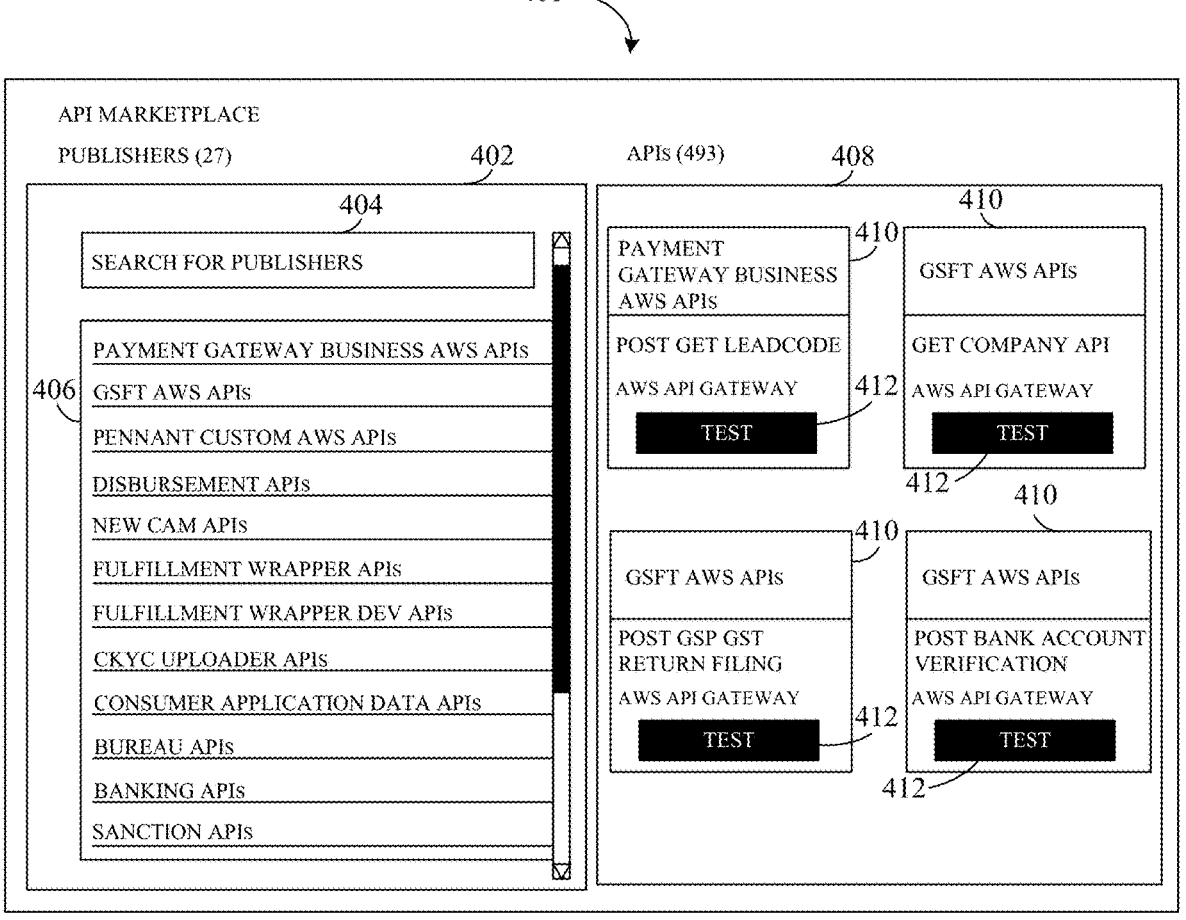
FIG. 4 illustrates an example of an application programming interface (API) test interface of a workbench frontend web application, according to embodiments of the present disclosure.

FIG. 4 illustrates an example API test interface 400 of the workbench frontend web application 302. FIG. 4 is described in conjunction with the previous figures. The APIs are configured to be made discoverable through the OpenAPI specification, which allows the CADMS 200 to discover a list of APIs exposed by a provider and also ascertain inputs expected by the APIs and outputs from the APIs. The discovered APIs are listed to the developer 232 in a way similar to presenting a list of applications on the applications store. The developer 232 may click on each of the listed APIs to view expected inputs and outputs visually laid out and also allows the developer 232 to test the APIs within the CADMS 200.

The API test interface 400 provides an intuitive input or output mapping screen that may be used to visually see the structure of the inputs and outputs of the API and select specific fields. The structure of the inputs and outputs, that are nested under several layers of Json, are visible. The CADMS 200 automatically generates expressions required to extract one or more fields of the APIs and maps the API in a streaming manner at runtime. Based on the mapping, the API is validated if the mapped structure is a valid Json and as a result, API invocation failures due to malformed Json structures caused by human errors, is prevented.

The API test interface 400 renders information corresponding to the APIs that are linked with the API-MP 224. The API test interface 400 includes a publisher portion 402 and an API list portion 408. The publisher portion 402 includes a publisher search bar 404 that allows the developer 232 to provide a name of the provider corresponding to any APIs linked to the API-MP 224 for searching the publisher. The publisher portion 402 also includes a list of publishers 406 along with a number of corresponding APIs that are linked to the API-MP 224. Each of the publishers in the list of publishers 406 includes at least one API linked to the API-MP 224. The APIs, in some embodiments may be present as a service in the core services block 240 or as a service in the customer/vendor services block 332. In some embodiments, the API may be exclusive to at least one client of the client system 203. In some embodiments, the APIs may be hosted on a private or public cloud. In some embodiments, the developer 232 may restrict visibility of APIs of any specific publisher or based on source of the APIs.

The API list portion 408 includes separate information block 410 corresponding to each of the APIs that are linked to the API-MP 224. The information block 410 includes a testing interface element 412. Interaction of the developer 232 with the testing interface element 412 allows testing the corresponding API and also view input and output parameters for wiring the corresponding API in any workflow. The testing allows the developer 232 or the user to determine the feasibility of binding the input values and output values between the tested API and the workflow.

In some embodiments, the testing interface element 412 may be disabled based on the preferences of the client. In some embodiments, the information block 410 may include detailed information related to the APIs, such as name of the corresponding publisher, and the success rate related to utilization or performance of the APIs. In some embodiments, the API list portion 408 includes one or more groups of multiple APIs with the same or similar functionality. In some embodiments, if any of the APIs in the API list portion 408 is determined to have continually failed, the user or the developer 232 may receive suggestions for an alternate API with the same or similar functionality. In some embodiments, a client of the client system 203 may be allowed to perform actions on the API test interface 400 similar to the developer 232.

Figure 5A:
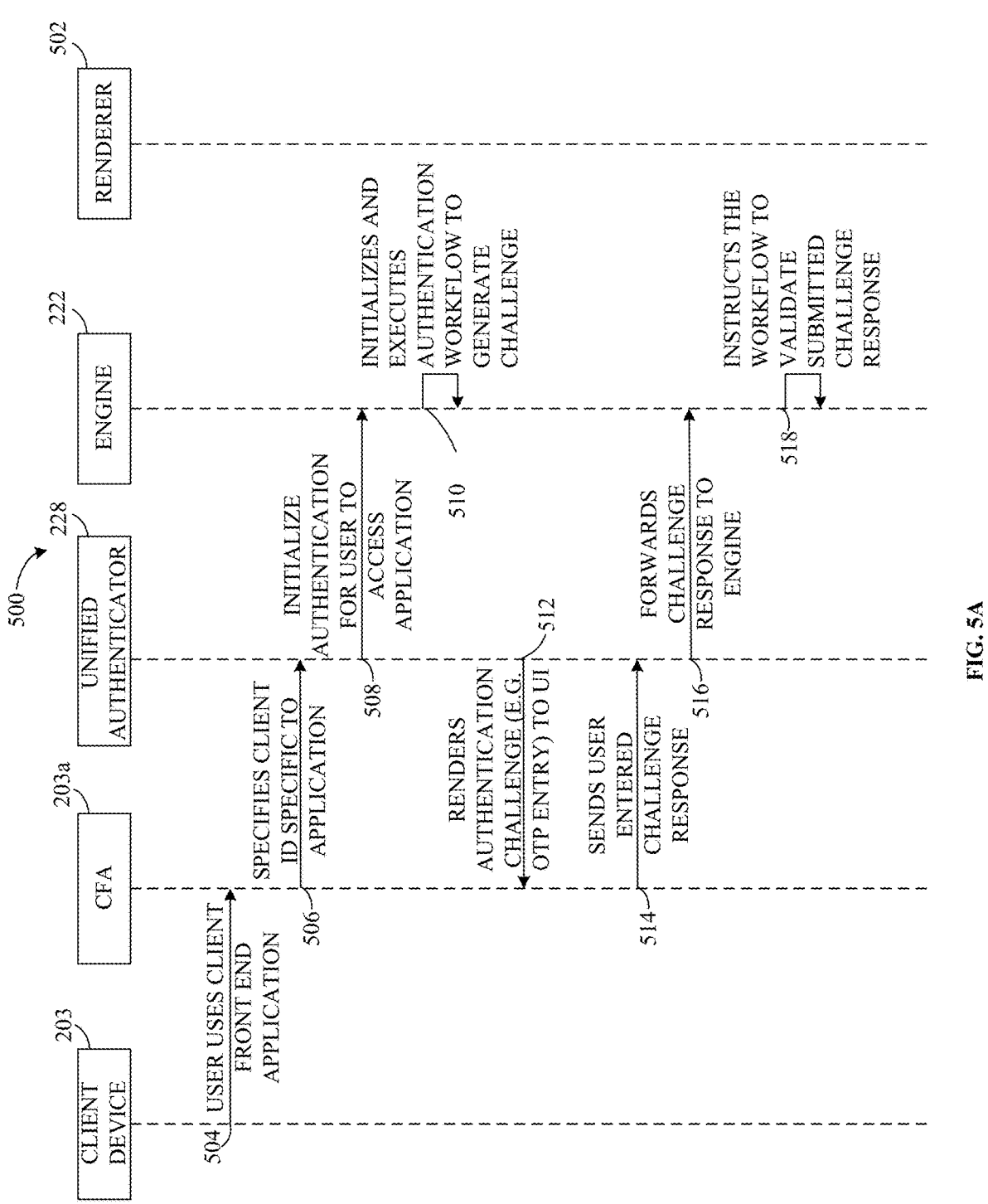
FIGS. 5A, 5B, and 5C illustrate an example sequence diagram depicting interactions between components of the CADMS for authorizing a user, according to embodiments of the present disclosure.
Figure 5B:
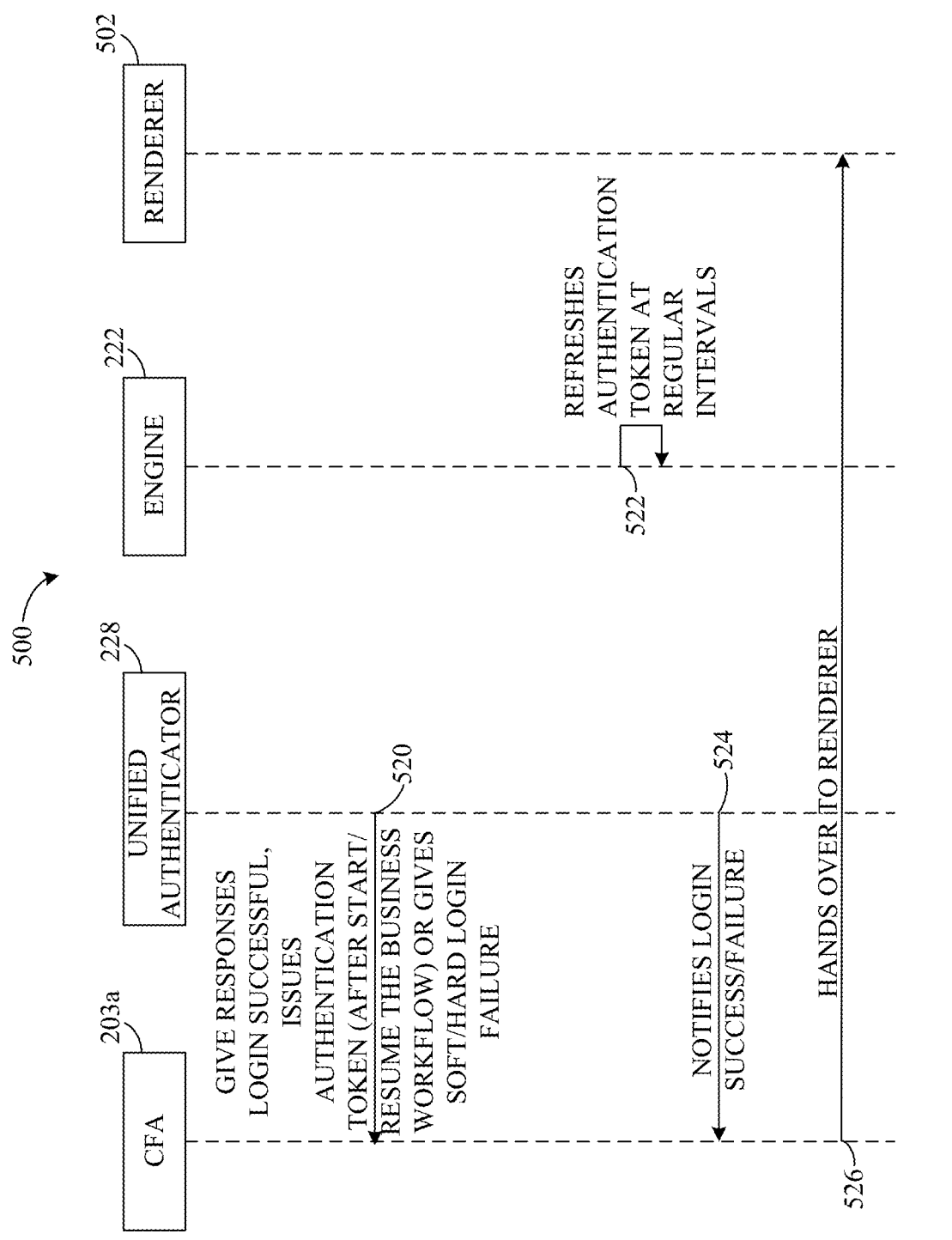
Figure 5C:
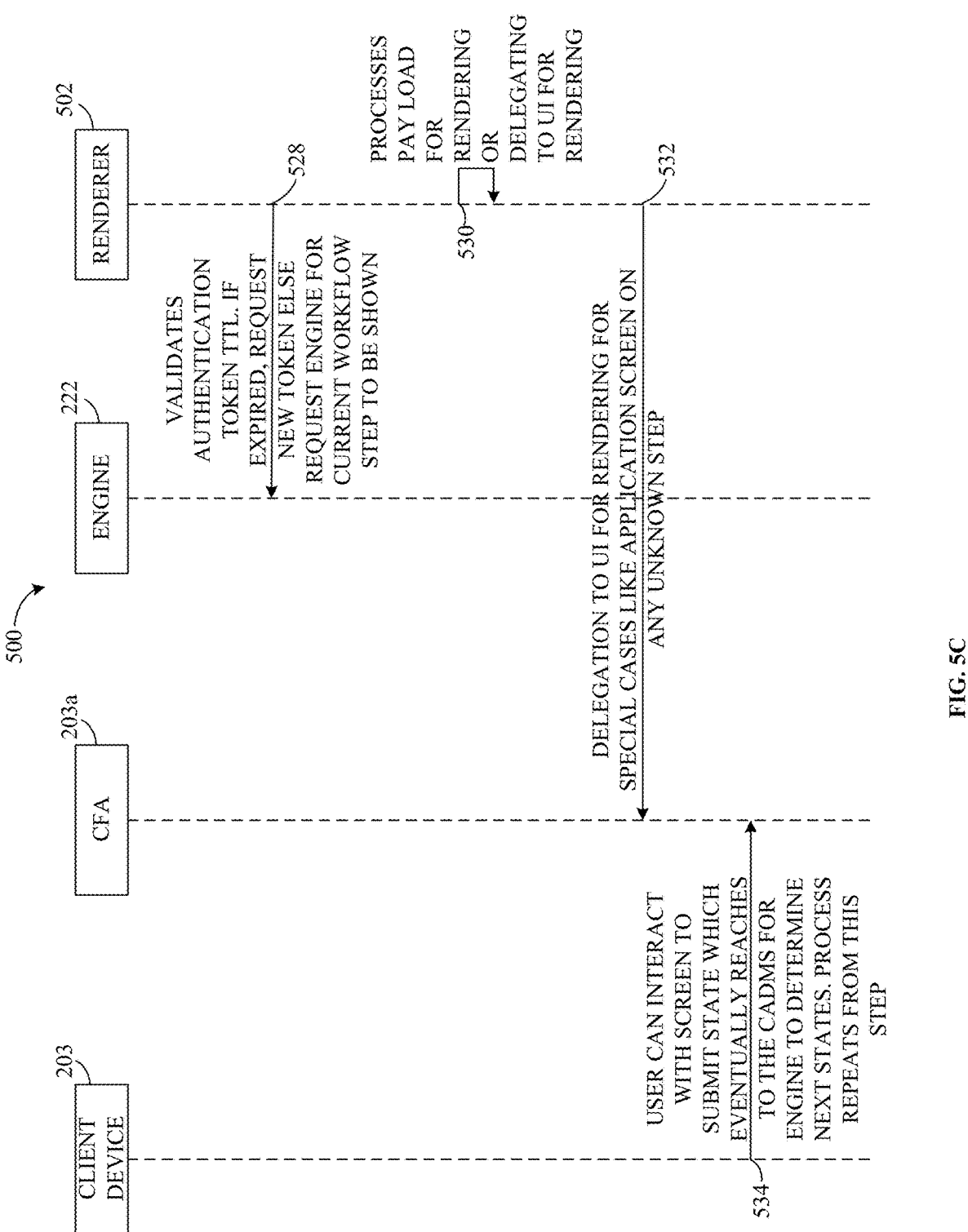

FIGS. 5A, 5B, and 5C illustrate an example sequence diagram 500 depicting interactions between the components of the CADMS 200 for authorizing a user, such as a client of the client system 203 or an end user, according to embodiments of the present disclosure. FIGS. 5A, 5B, and 5C—are described in conjunction with the previous figures. A frontend library related to the unified authenticator 228, integrates seamlessly with a renderer 502. The renderer 502, in some embodiments, is similar to the renderer described in the previous figures. The CADMS 200 provides configurable authorization and authentication via an authentication workflow by utilizing the unified authenticator 228. The CADMS 200 allows the developer 232 to utilize different authentication mechanisms. In some embodiments, the configurable authorization and authentication are achieved using open authorization (OAuth 2.0).

The frontend library of the unified authenticator 228 is used for determining that the end user interacting with the custom application is authorized and authenticated to use the custom application or to perform one or more functions corresponding to the custom application. The end user and client, in FIGS. 5A, 5B, and 5C, is referred to as the user for the sake of simplicity. Further, the usage of the frontend library of the unified authenticator 228 avoids presenting repeat requests to the user for inserting credentials while switching between services of the custom application or the components of the CADMS 200. Also, if the authentication and authorization fail, the unified authenticator 228 restricts access to any specific process or components. In some embodiments, the unified authenticator 228 allows the developer 232 to define the different custom authentication flows for different steps of the workflow or different components of the CADMS 200. For example, the different custom authentication flows include the username/password, OTP, fraud check during the username/password entry step.

Further, the CADMS 200 allows the clients to define authentication or authorization logic using the workflow. Therefore, when the user accesses a website of the custom application built using the CADMS 200, the unified authenticator 228 authenticates the user based on a customizable logic defined through the workflows. In some embodiments, when the workflow invokes external APIs, the CADMS 200 provides authentication information to the external APIs. The developer 232 defines configurations such as URL, and client secret for external authenticators. Examples of the external authenticators include, but not limited to, Keycloak, Azure, Google that support the OpenID Connect (OIDC) protocol. Therefore, the CADMS 200 transparently retrieves tokens from the external authenticators and passes to the APIs invoked via the API MP 224 ensuring that the API invocations are secure.

The sequence diagram 500 begins at instant 504 where a user accesses the corresponding CFA 203*a*. At instant 506, on determining the access, the CFA 203*a* provides a client identifier (ID), specific to the custom application, to the unified authenticator 228. At instant 508, the unified authenticator 228 initializes authentication for the user, corresponding to the client ID, for accessing the custom application. At instant 510, upon initialization of authentication of the user, the engine 222 initializes and executes an authentication workflow to generate a challenge. At instant 512, on executing the authentication workflow, the unified authenticator 228 renders an authentication challenge, such as an OTP entry, to the UI corresponding to the CFA 203*a*.

At instant 514, the CFA 203*a* sends a user entered challenge response, received through the UI, to the unified authenticator 228 and at instant 516, the unified authenticator 228 forwards the challenge response to the engine 222. At instant 518, the engine 222 instructs the authentication workflow to validate submitted or the received response to the authentication challenge. The validation depends on the type of the authentication challenge provided to the user. At instant 520, on validating the received response, the unified authenticator 228-_provides or gives a response that login was successful. The unified authenticator 228-_also issues an authentication token after starting or resuming the workflow (e.g., business workflow), or the engine 222 gives a soft or hard login failure to the CFA 203*a*. The soft or hard login failure response to the unified CFA 203*a* may either result in blocking the user completely from proceeding with the process or expecting another round of login information or a different client ID from the user. The soft failure, for example, is entry of an invalid OTP, and the user may be allowed to retry OTP generation and entry. The hard failure, for example, is entry of an invalid OTP thrice and the user may not be allowed to retry generation and entry of the OTP for the fourth iteration.

Further, at instant 522, the engine 222 refreshes the authentication token at regular intervals. At instant 524, the unified authenticator 228 notifies the login success or failure to the CFA 203*a*, which 203 at instant 526, hands over control to the renderer 502. Multiple libraries are being handled by the renderer 502 and upon completing initial authentication, the renderer 502 displays a relevant UI. The renderer 502, at instant 528, validates Time To Live (TTL) of the authentication token. The TTL represents a period of time that the issued authentication token should remain active on one or more systems or networks before being discarded. If the authentication token is expired, the renderer 502 requests a new authentication token from the engine 222, else the renderer 502 requests the engine 222 to provide the current step of the workflow. Requesting a new authentication token automatically avoids a situation where the user is required to validate periodically.

Further, at instant 530, the renderer 502 processes payload, which is essential information for rendering or delegating to the UI for rendering. Also, the renderer 502, at instant 532, delegates information to the UI for rendering for special cases like application screen on any unknown step. Upon rendering at the UI, at instant 534, the user can interact with a screen of the client system 203 at submit information regarding a state eventually reaches to the CADMS 200 for the engine 222 to determine next states. The submission of the state from the user may be related to or involve submitting inputs required during a state or submitting the choice of a state the user prefers to be at. Further, the process depicted in the sequence diagram 500 may be repeated periodically or based on any event trigger.

Figure 6:
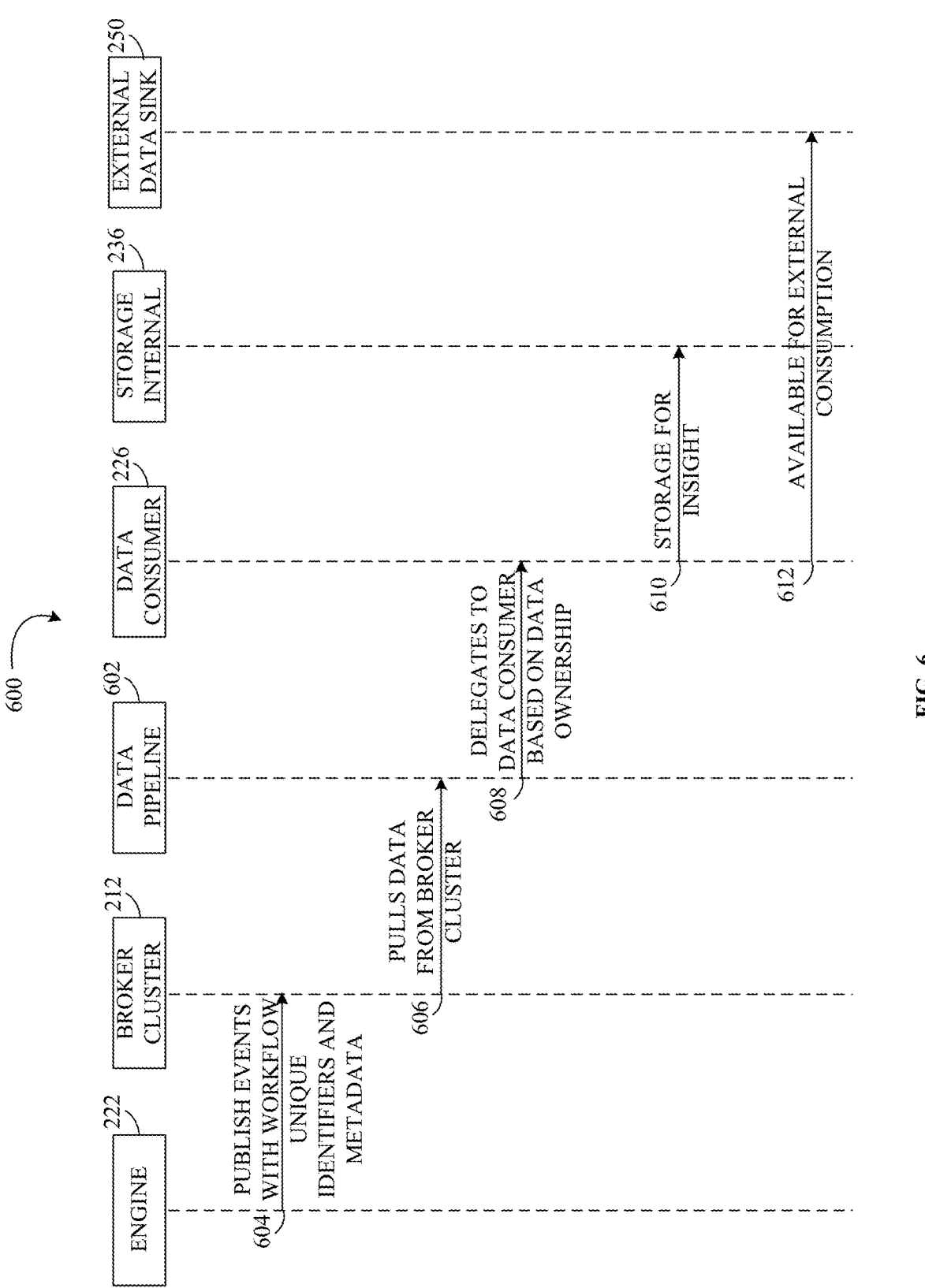
FIG. 6 illustrates an example sequence diagram depicting interactions between the components of the CADMS for providing data for internal and external consumption, according to embodiments of the present disclosure.

FIG. 6 illustrates an example sequence diagram 600 depicting interactions between the components of the CADMS 200 for providing data for internal and external consumption, according to embodiments of the present disclosure. FIG. 6 is described in conjunction with the previous figures. The CADMS 200 provides data to the developer 232 through the designer-and-insights component 230. The developer 232 may utilize the data for, without limitation, determining roadblocks in a process and number of executions of any vertex of a workflow by the engine 222. The CADMS 200 provides data to external users, such as the clients of the client system 203, and for displaying analytics and notifications.

The sequence diagram 600 begins at instant 604, where the engine 222 publishes the granular events with workflow unique identifiers and metadata to the broker cluster 212. Execution of each vertex of the workflow or each step of the workflow by the engine 222 generates data or information. Further, every instance of communication between different components of the CADMS 200 or blocks within the DMD 204 generates data or information. The generated data or information is referred to as granular events and different components of the CADMS 200 may utilize the generated data for different purposes. The workflow unique identifiers are generated each time the custom application is accessed and executed. The workflow unique identifiers allow determining a specific instance of execution of a custom workflow that allows the developer 232 to access, review, and utilize information particularly related to a specific instance of execution of the custom workflow. A stage of the workflow would be associated with, but not limited to, a name, a unique identifier, a start time of execution, an end time of execution, and a duration of execution, that are categorized as the metadata published to the broker cluster 212.

At instant 606, a data pipeline 602 pulls data from the broker cluster 212. The data pipeline 602 may be a component of the CADMS 200 that exists for specifically accessing the data from the broker cluster 212 and distributing the data amongst the other components of the CADMS 200. In some embodiments, the data pipeline 602 includes the data pipeline 320. At instant 608, the data pipeline 602 delegates the data to the data consumer 226 based on data ownership. The data consumer 226 may include different sections of consumers who are interested in obtaining data related to different aspects of the workflow. For example, in case of a loan payment application, the CADMS 200 includes a consumer interested in and registered for solely payment information and in case of a loan request application, the CADMS 200 may include a consumer interested in and registered for details of an individual requesting a loan. Each application may have different consumers registered with the client system 203 or the CADMS 200 based on respective interests. Data corresponding to payment is directed to payment consumer and data corresponding to loan application is directed to loan application consumer. Therefore, depending on a source of data, such as data owner, and the custom application utilized by the data owner, the data is directed to one or more consumers of the data consumer 226. The data consumer 226, at instant 610, stores the data at the storage-internal 236 that allows the developer 232 to access the data for analytics to determine status of the custom workflow. The developer 232 may also be able to access at least the granular events. Further, the data consumer 226, at instant 612, provides the data to the external data sink 250 for external consumption, such as for the client data pipeline 256. Providing the data to the external data sink 250 allows the client system 203 to access and utilize the data for custom analytics and for debugging or verification in case the custom application fails to respond or responds in an unexpected way.

Figure 7:
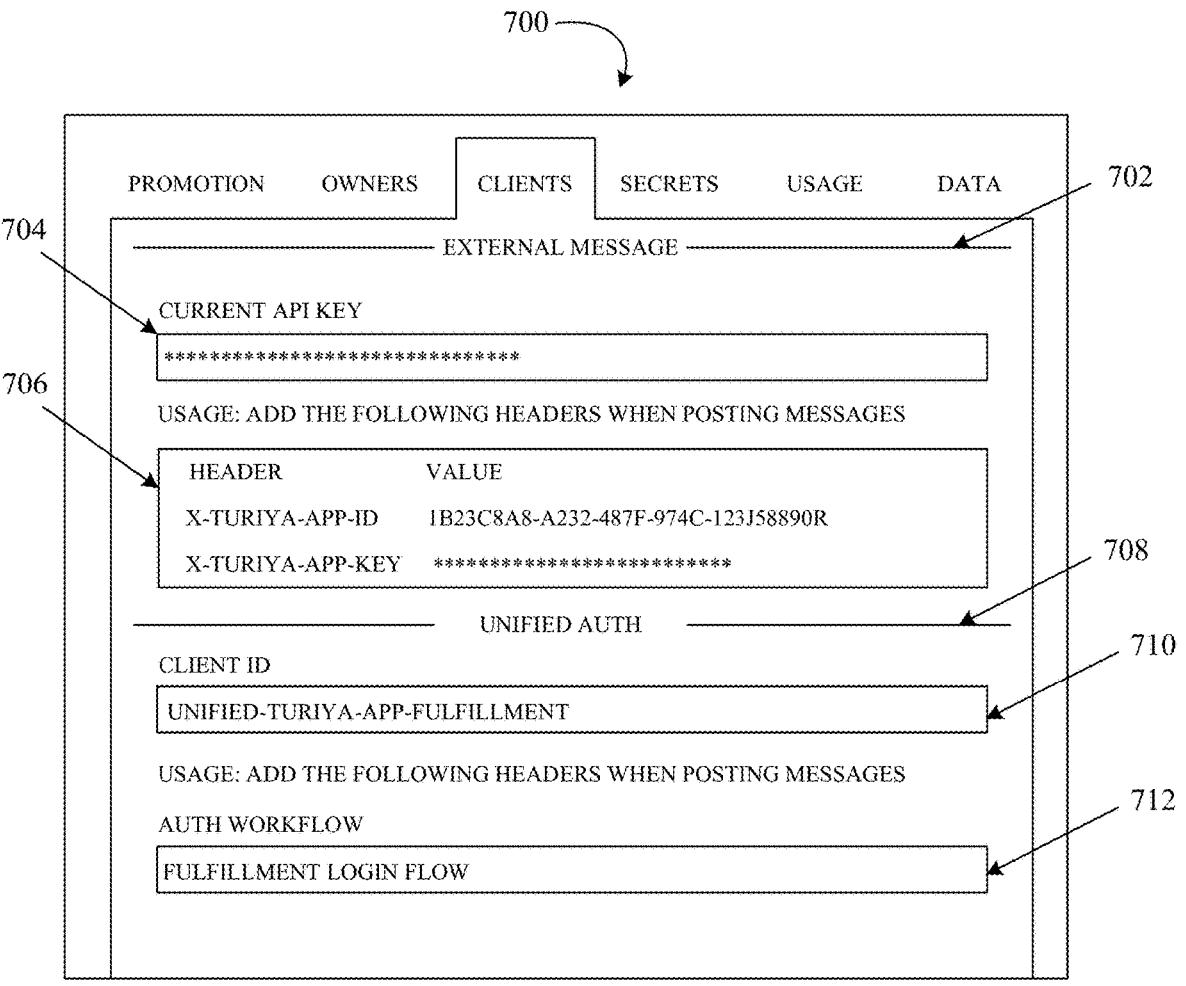
FIG. 7 illustrates a user interface for configuring an authentication mechanism for a client, according to embodiments of the present disclosure.

FIG. 7 illustrates a user interface 700 for configuring an authentication mechanism for the client, according to embodiments of the present disclosure. FIG. 7 is described in conjunction with the previous figures. For authenticating the client, the unified authenticator 228 allows sections of the custom application to have different mechanisms of authentication for the custom application, unlike the Single Sign-On (SSO) which utilizes a single username and password for an entire application. The usage of the different authentication mechanisms can be created using the user interface 700 by the developer 232.

The credentials may be received from Azure Active Directory. An organization may specify that to access a corresponding API, the user or the developers 232 requires a key. The organizations may provide either a fixed key or a dynamic key based on security requirements for authentication. The fixed key and the dynamic key may be provided to the user or developer 232 using an external authenticator, for example, Azure AD™, Keycloak, or AWS Cognito™. The external authenticator allows the workflow to retrieve access tokens from an external OIDC authentication provider. The access tokens that are sent to the APIs are invoked via the API-MP 224.

The user interface 700 includes an external message portion 702 and a unified auth portion 708, which corresponds with the unified authenticator 228. The external message portion 702 includes a current API key display block 704 which is a code used to identify and authenticate one or more backend systems corresponding to the custom application or the user. In some embodiments, the current API key in the current API key display block 704 is hidden using symbols or alphanumeric characters. The current API key display block 704 provides the current API key that may be used in external messages. The backend systems directly interact with the CADMS 200 using the external messages. The external message portion 702 also includes a header and value block 706 that displays a name of a header in a header column and a corresponding value in a value column. The external message portion 702 provides details that allow the backend system, that may be non-human intervention system, to interact with the CADMS 200 by providing the secret API key to establish authenticity. The head and value block 706 provides a way to use the current API key in the current API key display block 704. A name of an ID of the custom application, for example x-turiya-app-id, is displayed under the header column and characters of the ID are displayed under the value column. Further, for example, x-turiya-app-key is displayed under the header column and characters of corresponding to the current API key is displayed under the value column. While using the API key, the client is required to be aware of and mention a name under which the current API key is shared or sent. Further, the client is required to mention which application the current API key is to be associated with. When the current API key is to be shared, the headers in the header column are used along with the value. The current API key in the current API key display block 704 is same as the value corresponding to the x-turiya-app-key in the header column.

The unified auth portion 708 includes a client ID display block 710 that displays an ID specific to a client accessing or requesting access to the custom application and identifying and authenticating users. The unified auth portion 708 provides details to identify human users of a custom frontend application built using the CADMS 200. The unified auth portion 708 further includes an authentication workflow display block 712 that displays the name of the workflow or the sub-workflow the client corresponding to the client ID is allowed to access. When the unified authentication is utilized, each of the custom applications corresponding to the CADMS 200 is associated with at least one authentication workflow. Based on the authentication workflow, the CADMS 200 determines an authentication logic corresponding to a custom application. The authentication workflow display block 712 displays or receives a name of the authentication workflow, for example, the fulfilment login flow that corresponds with the custom application.

Figure 8:
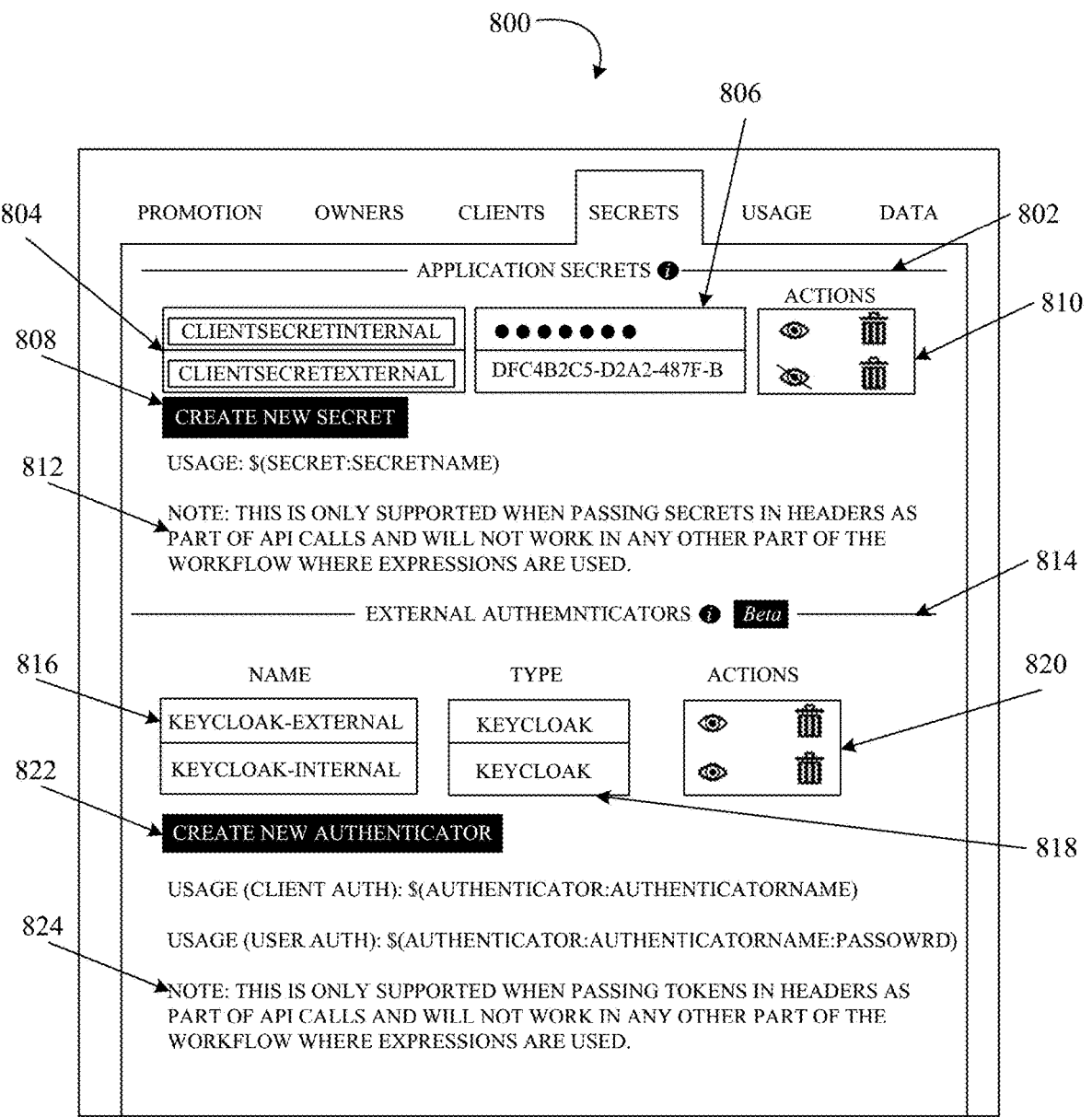
FIG. 8 illustrates a user interface for management of sensitive information, according to embodiments of the present disclosure.

FIG. 8 illustrates a user interface 800 for the management of sensitive information, according to embodiments of the present disclosure. FIG. 8 is described in conjunction with the previous figures. For using any sensitive information, such as secrets, in the workflow, the sensitive information may be configured beforehand and mapped with an identifier. The sensitive information may be used in the workflow by referring to the identifier. The engine 222 may receive credentials from the identity/access management component 228, for example, Azure Active Directory (AD). Organization may specify that, to access a corresponding API the developer 232 requires a key. The organizations may provide either a fixed key or a dynamic key based on security requirements for authentication. The fixed key and the dynamic key may be provided to the developer 232 using an external authenticator. Examples of external authenticators include Azure AD™, Keycloak, and AWS Cognito™.

In an embodiment, the identity/access management component 228 may provide the fixed key and the dynamic key. The external authenticator allows the workflow to retrieve access tokens from an external system through protocols. The protocols allow the organizations to verify the identity of the developer 232, based on the authentication performed by an Authorization Server. Further, the protocols allow the workflow to obtain basic profile information about the developer 232 OIDC authentication providers. The OIDC protocol is used for transferring tokens and any application built on top of the OIDC protocol is capable of generating and providing access tokens. The access tokens are passed along to the APIs invoked via the API-MP 224 protocol. The access tokens allow the clients to verify the identity of the developer 232 based on the authentication performed by an Authorization Server, as well as to obtain basic profile information about the developer 232 in an interoperable and REST-like manner.

The CADMS 200 includes a vault for managing credentials or secrets. One or more sensitive tokens or passwords are securely stored in one or more memory elements such as the platform DB 234 and the insights data store 236. The stored tokens or passwords may be used in the workflow by specifying merely name of the sensitive information rather than specifying information on the access tokens.

The user interface 800 includes an application secrets portion 802 that comprises an identifier block 804 and a secret name block 806. A user from an organization may enter an identifier in a row corresponding to the sensitive information, at the identifier block 804 and the secret name block 806, respectively. Hence the sensitive information is not hardcoded to the workflow thereby guarding the sensitive information from being exposed and allowing the workflow to utilize the sensitive information through the respective identifier. For example, if a developer 232 opens the workflow, the sensitive information linked to or used by the workflow is not exposed to the developer 232, thereby guarding the sensitive information. The application secrets portion 802 also includes an action block 810 that includes one or more action interface elements for each row in the identifier block 804 and secret name block 806. The one or more actions include a hide action for hiding the secret information in the corresponding row and a delete action for deleting the corresponding row. Further, the application secrets portion 802 also includes a create new secret element 808 that receives a request from the user from the organization to create a new secret and renders a new row in the identifier block 804 and a corresponding row in the secret name block 806. For example, the user from the organization interacts with the create new secret element 808 to create a row in the identifier block 804 and a corresponding row in the secret name block 806. The user from the organization may enter sensitive information in, such as dfc4b2C5-D2a2-487f-b, or retrieve the sensitive information from a memory element to, the newly created row of the secret name block 806. The user from the organization 232 may then enter an identifier, such as clientsecretexternal, in the newly created corresponding row in the identifier block 804 that may be used internally within the CADMS 200 or in the custom application supported by the CADMS 200. Further, the user interface 800 includes a notification or instruction portion 812 for providing information or instruction regarding the usage of the sensitive information or the identifier and applicability of the identifiers and the corresponding sensitive information, also referred to as secret.

The user interface 800 includes an external authenticator (EA) portion 814 that includes a key name portion 816, a key type portion 818, and an actions portion 820. The key name portion 816 includes row for a name of the access key and the key type portion 818 includes corresponding row with information regarding a type of the access key type. The actions portion 820 is similar to the action block 810 with similar interface elements and corresponding functions. The EA portion 814 further includes a create new authenticator element (CNAE) 822. Upon detection of an interaction of the developer 232 with the CNAE 822, a pop up is rendered that provides options related to what kind of external authenticator the developer 232 prefers to connect to. The developer 232 may choose, for example, a key type as Keycloak, and basic information such as URL of the key type in the rendered pop up. Further, the developer 232 may also choose an identifier for which the developer 232 prefers to retrieve the token source some basic information.

For example, the key type is configured as Keycloak by the developer 232 from multiple provided options. Since Keycloak is an application built on top of the OIDC, the access tokens may be provided for external authentication.

For example, the name of key is Keycloak-external, the type of the key is Keycloak. Further, the EA portion 810 includes a notification or information portion 816 for the developer 232. Further, the user interface 800 includes a notification or instruction portion 822 for providing information or instruction regarding the usage of the tokens and external authenticators and applicability of the access tokens and the corresponding external authentication.

Figure 9:
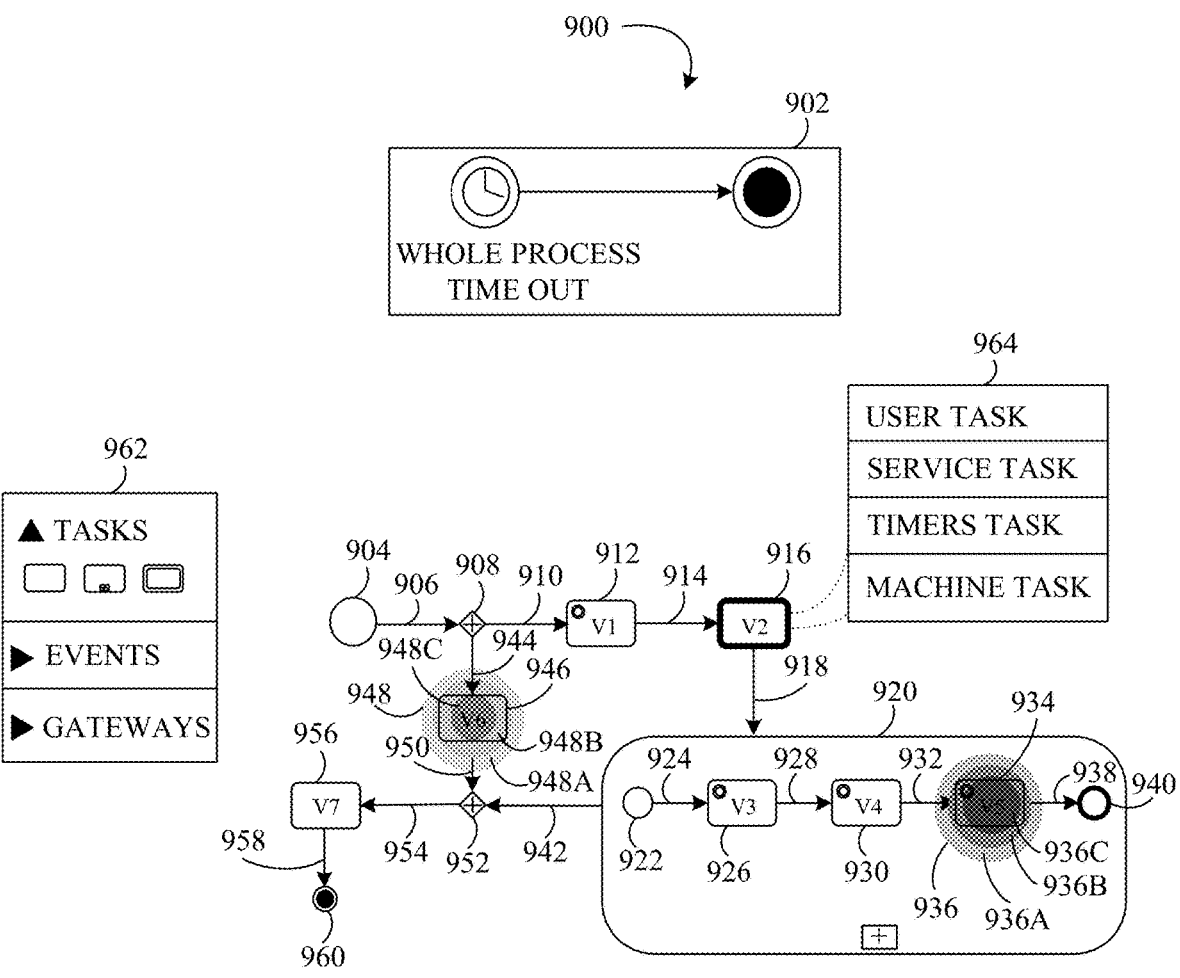
FIG. 9 illustrates an example of a directed graph that represents a workflow with heatmap characterization, according to embodiments of the present disclosure.

FIG. 9 illustrates an example of a directed graph 900 that represents a workflow with heatmap characterization, according to embodiments of the present disclosure. FIG. 9 is described in conjunction with the previous figures. The heatmap characterization provides information regarding frequency of processing or a number of times one or more blocks of the workflow are accessed. The blocks of the workflow, for example, includes vertices or task blocks, gateways or decision blocks. The blocks of the workflow are interconnected by one or more directed edges that represent flow of data or control between the blocks. For example, a direct edge connects a respective pair of the vertices. Each vertex is associated with a respective predefined task in a workflow corresponding to the directed graph 900. Further, the directed edges represent transitions and/or dataflow between predefined tasks.

A block 902 indicates a process time out information for the directed graph 900. The directed graph 900 corresponding to a process begins with a start event block 904 and data is provided to a gateway 908 through an edge 906. The data or control may be directed to one of a vertex V1 912 or a vertex V6 946 through an edge 910 and an edge 944, respectively. Predefined task corresponding to the vertex V1 912 processes or utilizes the directed data and provides an output that is directed to a vertex V2 916 through an edge 914. Similar to the vertex V1 912, the vertex V2 916 provides an output that is directed to a sub-process block 920 through an edge 918. The sub-process block 920 beings with a start event block 922 and the data from the vertex V2 916 is processed or utilized by vertices V3 926, V4 930, and V5 934 and by accessing the data through edges 924, 928, 932, respectively. The vertex V5 934 provides output data to other blocks of the directed graph 900 beyond the sub-process block 920 through an edge 938 and process corresponding to the sub-process block 920 ends at an end event 940.

Further, output data from the sub-process block 920 and output data from the vertex V6 946 is provided to a vertex V7 956 through edges 942 and 954, and 950 respectively. The output data from the sub-process block 920 and vertex V6 946 is provided to the vertex V7 956 through a gateway 952. The vertex V7 956 processes the received data, provides an output and terminates the process at a termination event 960. The engine 222 executes the respective predefined tasks of the each of the vertices V1 912, V2 916, V3 926, V4 930, V5 934, V6 946, and V7 956, henceforth referred to as V1-V7 912-956. The engine 222 provides or publishes data related to at least the execution of the vertices V1-V7 912-956.

The directed graph 900 may be constructed or assigned symbols using a palette of symbols 962 and each of the symbols from the palette of symbols 962 is associated with at least a corresponding predefined task and one or more symbols corresponding to the service task are associated with one or more APIs in the API-MP 224. The symbols from the palette of symbols 962 may be dragged and dropped to construct the workflow. The palette of symbols 962 includes all symbols for constructing the workflow of the directed graph 900. In some embodiments, the palette of symbols 962 includes a task section that comprises symbols for vertices corresponding to different tasks that the engine 222 may execute. The palette of symbols 962 also includes an events section that comprises symbols for representing events related to the workflow, such as start and end or termination of the workflow. The palette of symbols 962 also includes a gateways section that comprises symbols related to at least a decision block. Further, the palette of symbols 962 may further include general elements section (not shown) that includes symbols at least related to flow of data or control between the vertices, gateways, and events.

Further, the developer 232 may provide input parameters and accordingly modify the predefined tasks based on the input parameters to customize implementations of the predefined tasks. The modification may be performed by accessing a specific vertex that is intended to be modified. By accessing, the CADMS 200 provides an interface element 964 with a list of all the predefined tasks, which may be parameters, that the developer 232 may utilize to modify the predefined tasks. For example, on accessing the vertex V2 916, the interface element 964 with the list of all the predefined tasks is rendered for receiving a selection of a task or parameter corresponding to the vertex V2 916 from the developer 232. On receiving the selection, the vertex V2 916 is accordingly modified.

Each time the engine 222 executes a vertex, the engine 222 publishes data related to the execution as analytics data. The heatmap characterization of the directed graph 900 is formed using the analytics data from the insights data store 236 or the raw insights. The heatmap characterization provides a visual way of identifying areas or nodes whose execution takes more amount of time. Based on the heatmap characterization, the developer 232 may address pain points or slowness, resulting in improved execution and better conversion.

The heatmap characterization includes two modes such as a count mode and a duration mode. In the count mode, the CADMS 200 displays a heatmap of counts of execution of individual states within the workflow. This allows the developer 232 to ascertain one or more states in the workflow that are executed most often. By comparing the intensity of heat of individual states, the developer 232 may determine commonly utilized paths in a user journey. The count mode also allows the developer 232 to ascertain where a higher number of end users of a custom application corresponding to the directed graph 900 drop off by looking for states with light intensity next to states with a high intensity.

The duration mode allows the developer 232 to determine states in the workflow where users spend more time. The duration mode facilitates decision making that can be used to tune or optimize bottlenecks in the workflow. For example, a state in the workflow requires users to submit one or more documents for verification and then in the next state, wait for the documents to be processed. On reviewing the heatmap, the developer 232 may determine that the state corresponding to verification of the one or more documents takes longest. The CADMS 200 may then redirect more resources into verifying documents to speed up verification of one or more documents.

The heatmap characterization uses different colors to represent the information regarding the time taken at each step took during the journey and the time taken by each API or task tool. For example, the vertex V5 934 with higher frequency or higher number of processing can be represented by a first set of colors 936, in and around the vertex V5 934, that corresponds to the higher frequency or higher number of processing. The vertex V6 946 with lower frequency or lower number of processing can be represented by a second set of colors 948, in and around the vertex V6 946, that corresponds to the lower frequency or lower number of processing.

In some embodiments, the heatmap characterization utilizes color gradient to represent the information. Further, the heatmap characterization provides information, but not limited to, regarding how much time each step took during the journey and how much time each API/task took. In an example, the heatmap characteristics of the vertex V5 934 and vertex V6 946 may be represented using the first and second set of colors 936 and 948, respectively. The first set of colors 936 includes a gradient of colors 936A, 936B, and 936C and the second set of colors 948 includes gradient of colors 948A, 948B, and 948C. The gradient of colors corresponding to the first and second sets of colors 936 and 948 represents the frequency of processing performed by the respective vertices the color gradients V5 934 and vertex V6 946. The first set of colors 936 includes a darker shades of colors compared to the second set of colors 948 indicating that the frequency of processing performed by the vertex V5 934 is higher than the vertex V6 946. The intensities related to the first and second set of colors indicate which vertices were "hot", that is, which vertices were executed the most.

In an example, the heatmap characteristics of the vertex V5 934 can be represented by a darker shade of the color gradient for indicating the higher frequency or higher number of processing performed by the vertex V5 934, also indicating higher amount of heat emission. Similarly, the heatmap characteristics of the vertex V6 946 can be represented by a lighter shade of the color gradient for indicating the lower frequency or lower number of processing performed by the vertex V6 946, also indicating lower amount of heat emission compared with the vertex V5 934. In some embodiments, hovering on or interaction of the user with any block or node of the workflow provides a pop-up window or a UI with details of the users accessing or at the corresponding step of the workflow.

In some examples, the color gradient may include colors corresponding to same base color representing the higher and lower frequency colors, in and around the one or more blocks of the workflow. In some examples, the color red indicates greater frequency, the color yellow indicates lesser frequency, and the color blue indicates least frequency of the processing by the one or more blocks. In some examples, colors such as green, orange, or any other color may be used to represent different frequencies of the processing of the one or more blocks of the workflow represented by the directed graph 900.

Figure 10:
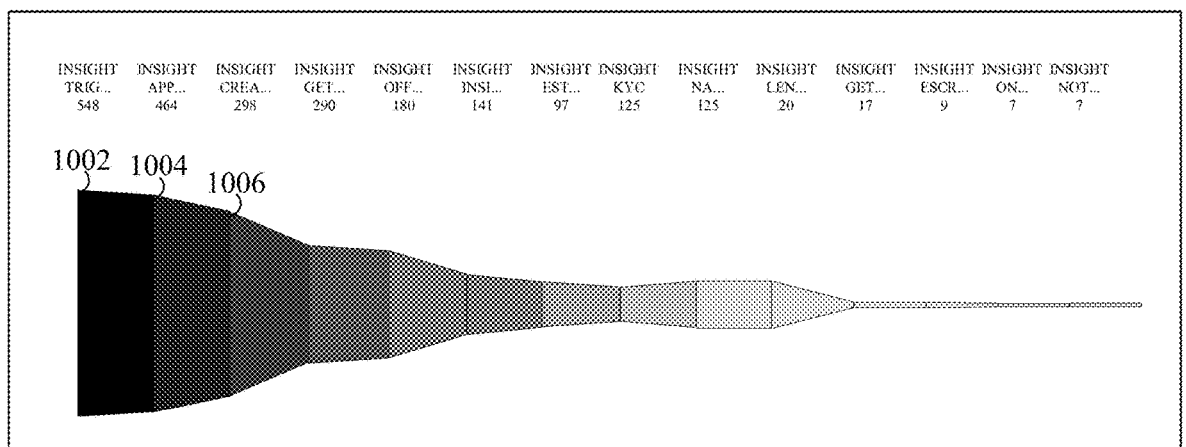
FIG. 10 illustrates a funnel diagram for visually representing statistical data related to the progression of processes corresponding to a computer-implemented application created and managed by the CADMS, according to embodiments of the present disclosure.

FIG. 10 illustrates a funnel diagram 1000 for visually representing statistical data related to the progression of processes corresponding to the computer-implemented application created and managed by the CADMS 200, according to embodiments of the present disclosure. FIG. 10 is described in conjunction with the previous figures. The funnel diagram 1000 is formed using the analytics data from the insights data store 236 or the raw insights.

The funnel diagram 1000 shows a funnel-like view with several rungs. Each rung corresponds to a particular step in the workflow and the height of each rung corresponds to the number of times a step has been executed. This allows the developer 232 to view the steps which correspond to end users dropping off, by comparing rungs with a large reduction in height.

The funnel diagram 1000 allows the developer 232 to inspect each step of the workflow corresponding to traceability of the workflow. The funnel diagram 1000 helps in determining how many customers visited one or more webpages of a website corresponding to the computer-implemented application, stepwise or process wise.

In some embodiments, the funnel diagram 1000 displays the time of one or more customers' visit, time spent at the website, number of payments made. The funnel diagram 1000 allows the developer 232 to determine whether an impediment or issue exists at a certain step if a sudden contraction is determined unlike a natural progression of contraction/drop. The developer 232 is allowed to make changes to the directed graph 900, and selection of APIs, and then view the funnel diagram 1000 in real-time to determine if the conversion has improved due to the changes made.

For example, the difference in height between rung 1002 and rung 1004 indicates that the number of end users reaching a step corresponding to the rung 1002 is greater than the number of users reaching a step corresponding to the rung 1004. Further, the difference in height between rung 1004 and rung 1006 indicates that the number of end users reaching the step corresponding to the rung 1004 is greater than the number of end users reaching a step corresponding to the rung 1006. Further, the funnel diagram 1000 displays variation in color in between the rungs based on the number of customers that visited a webpage corresponding to a step of the process. For example, a dark shade of a color between the rungs, such as the rung 1002 and the rung 1004 and a comparatively lighter shade of the color may be utilized to demonstrate a gradual decrease in number of end users between the steps corresponding to the rungs 1002 and 1006. In some embodiments, hovering on or interacting with any portion or rung of the funnel diagram 1000 provides a pop-up window or a UI with details of the developer 232 accessing or at the corresponding step of the workflow.

Figure 11A:
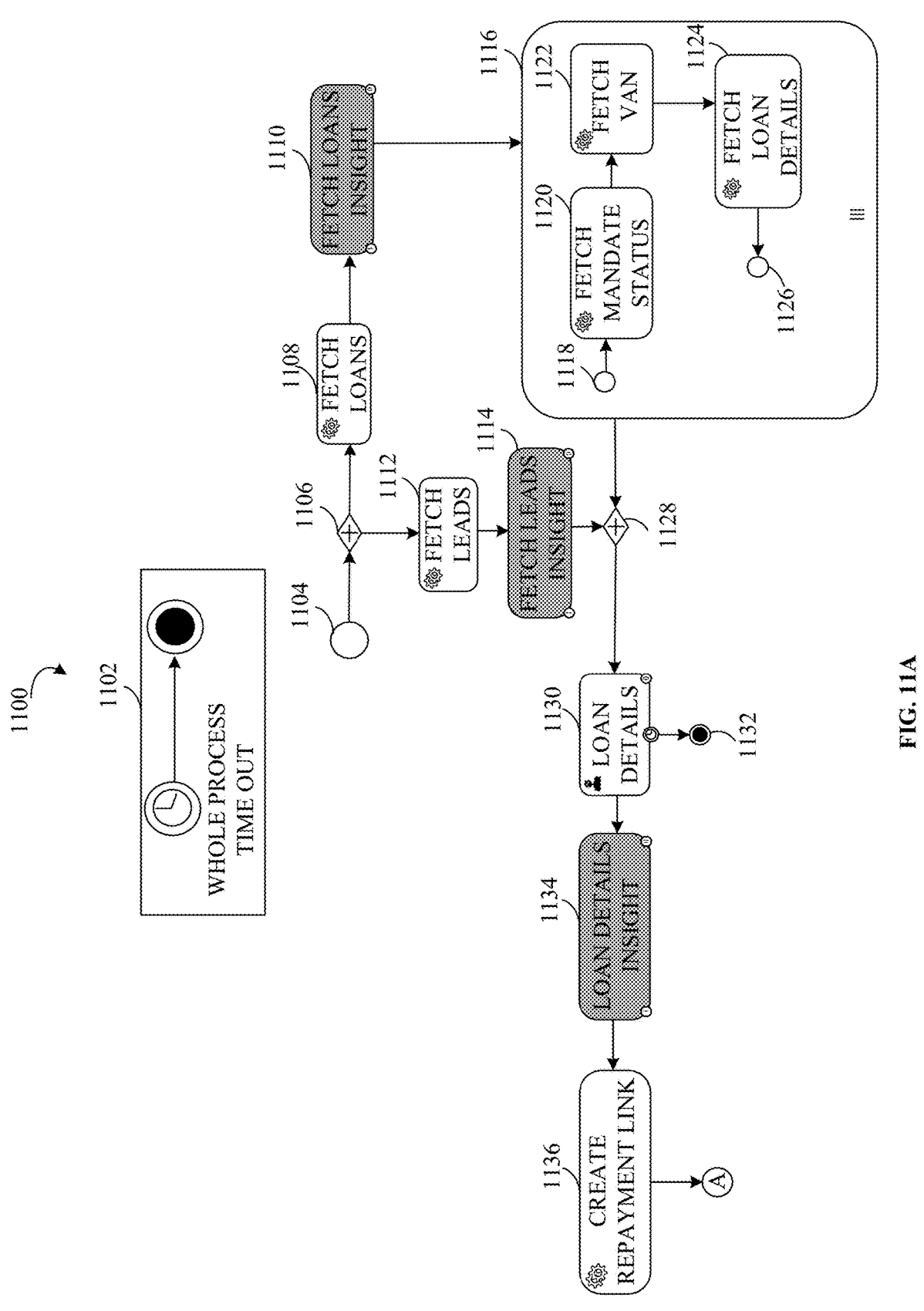
FIGS. 11A and 11B illustrate an example repayment workflow, according to embodiments of the present disclosure.
Figure 11B:
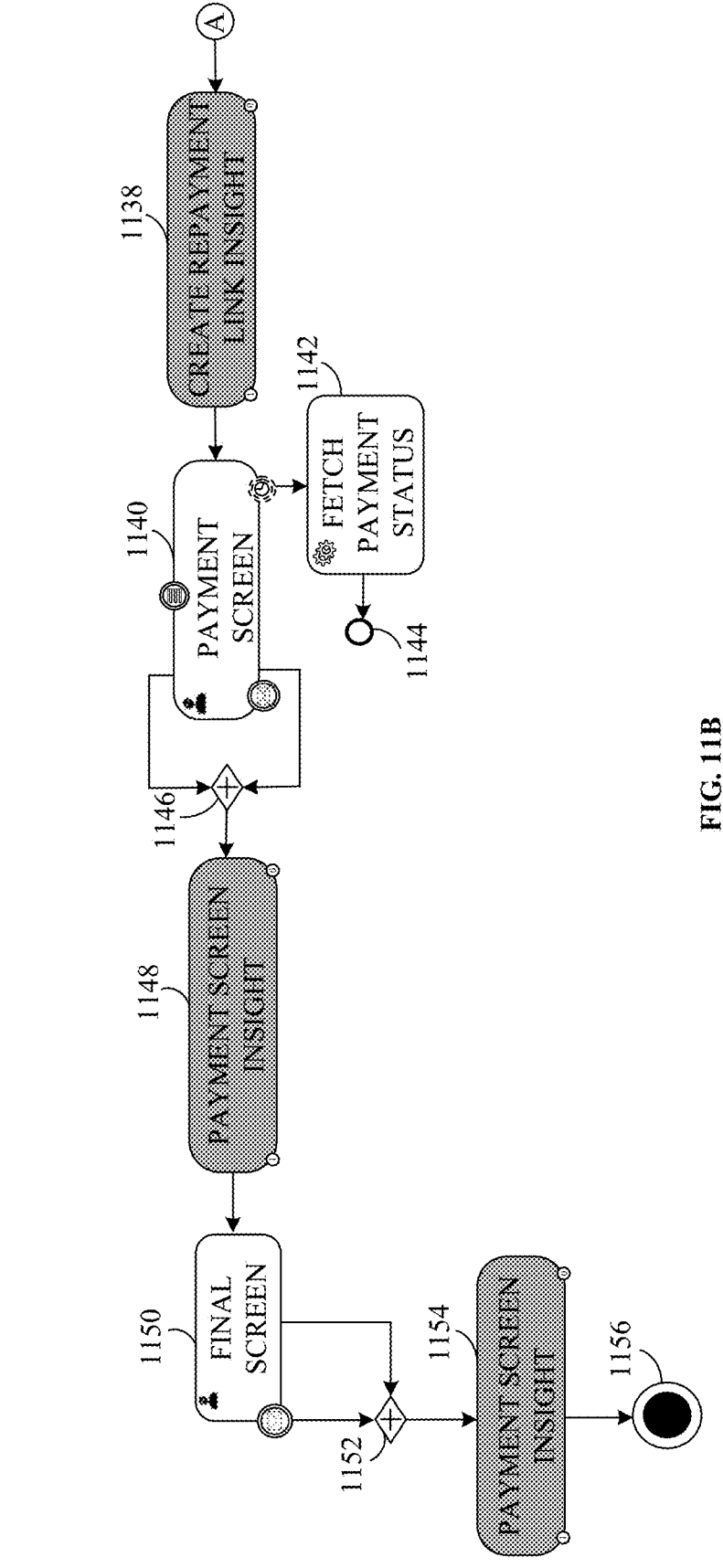
Figure 12A:
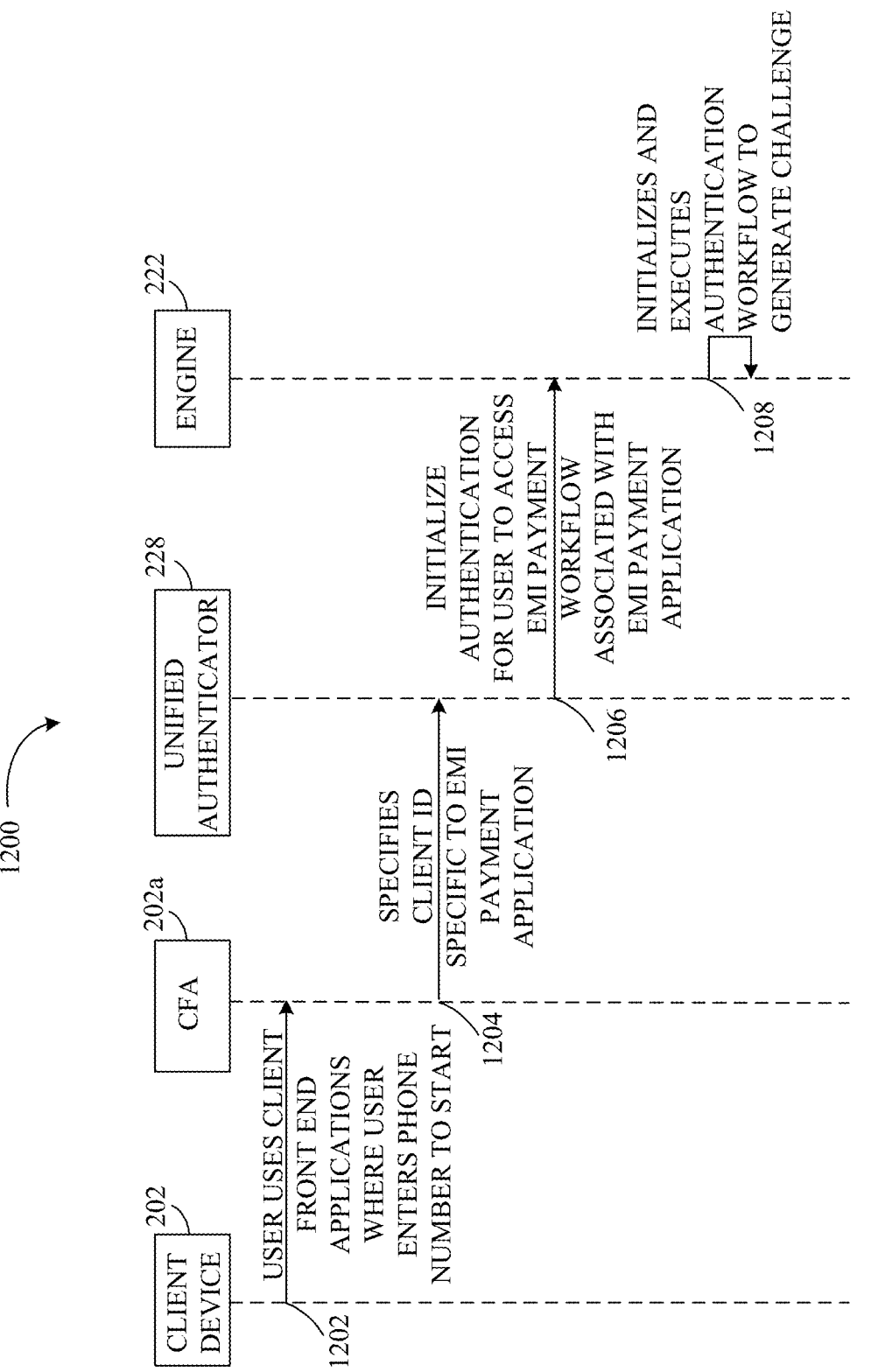
FIGS. 12A, 12B, 12C, 12D, 12E, 12F, and 12G illustrate an example sequence diagram of an equated monthly installment (EMI) management and payment procedure, according to embodiments of the present disclosure.
Figure 12B:
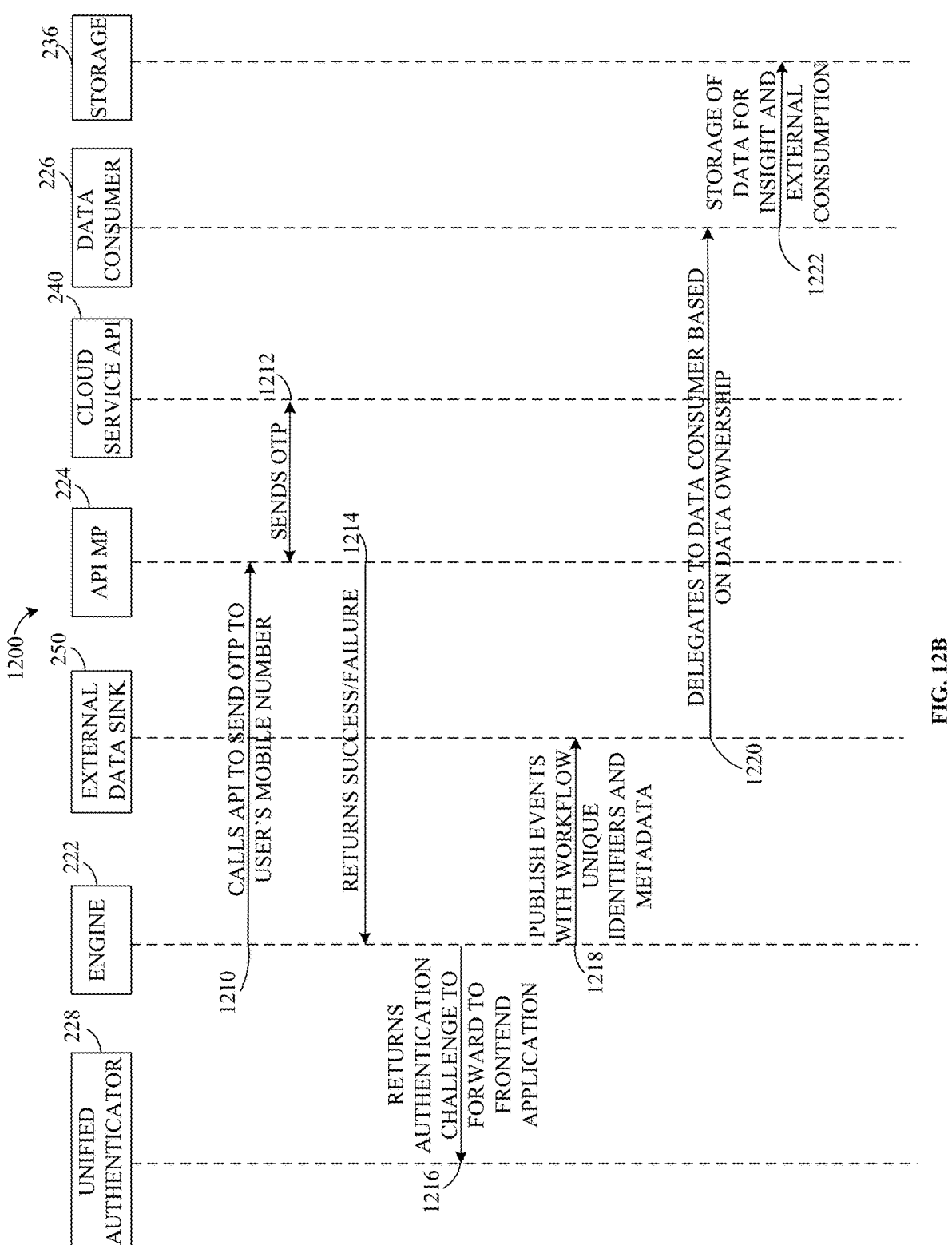
Figure 12C:
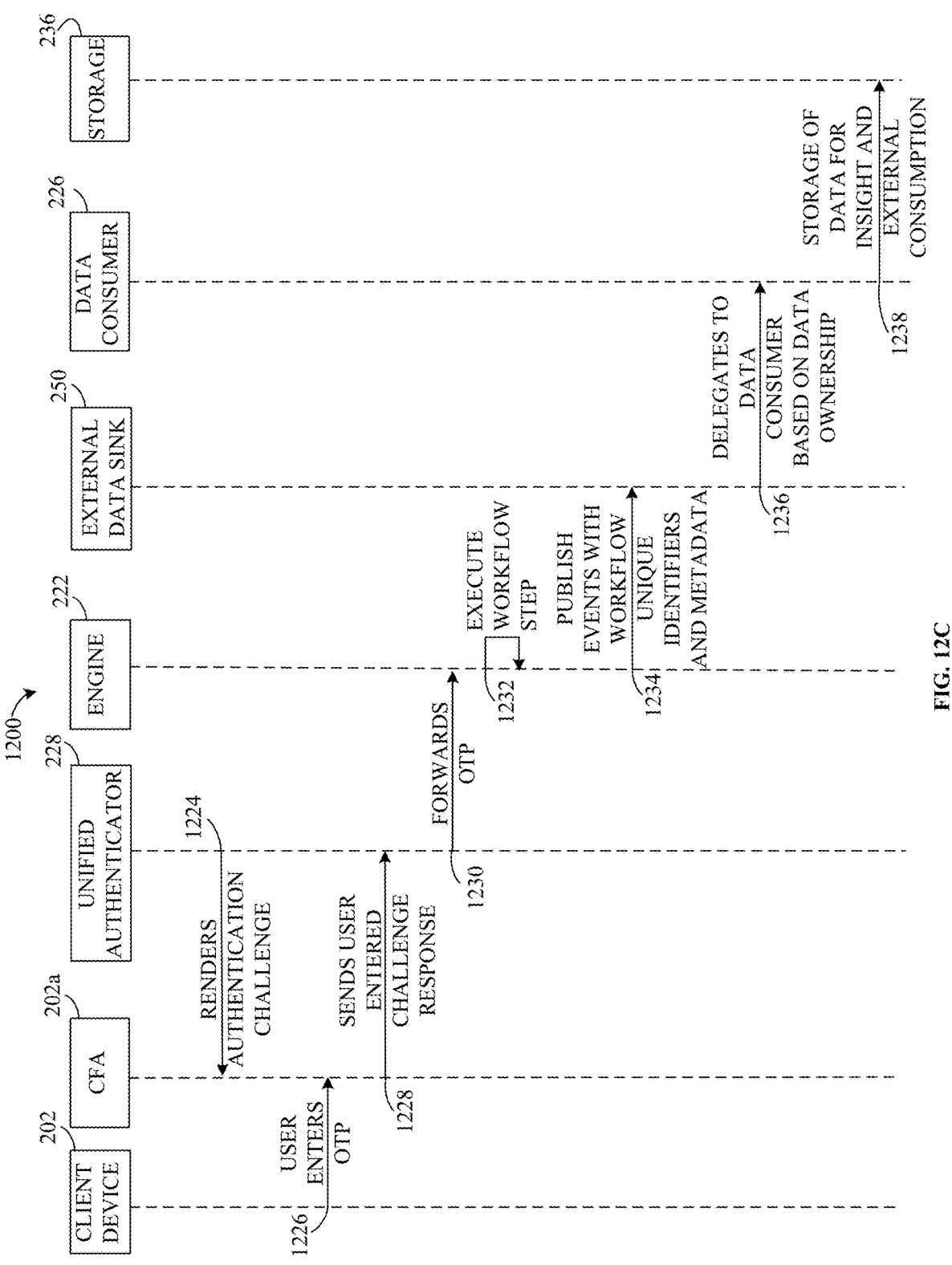
Figure 12D:
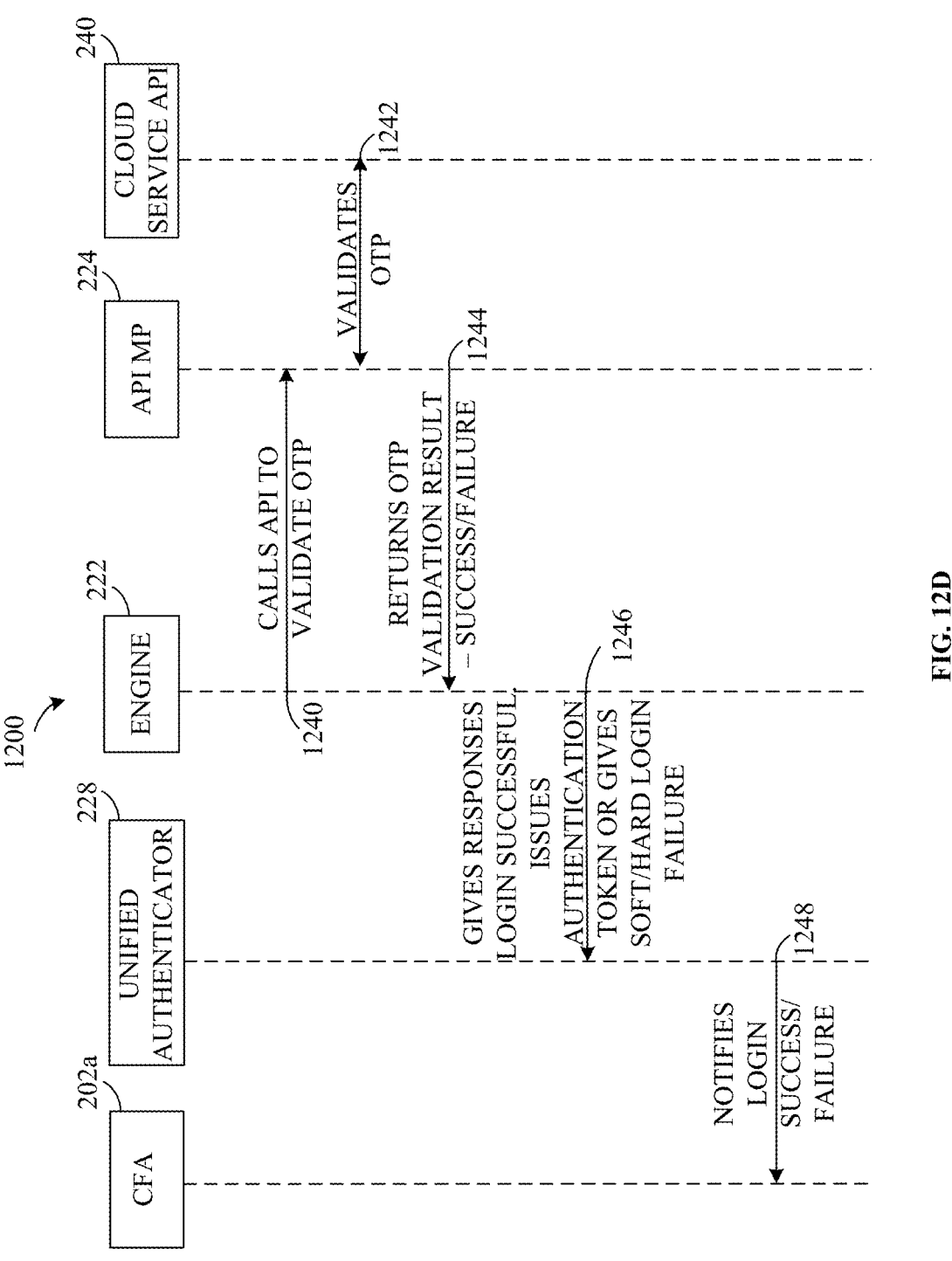
Figure 12E:
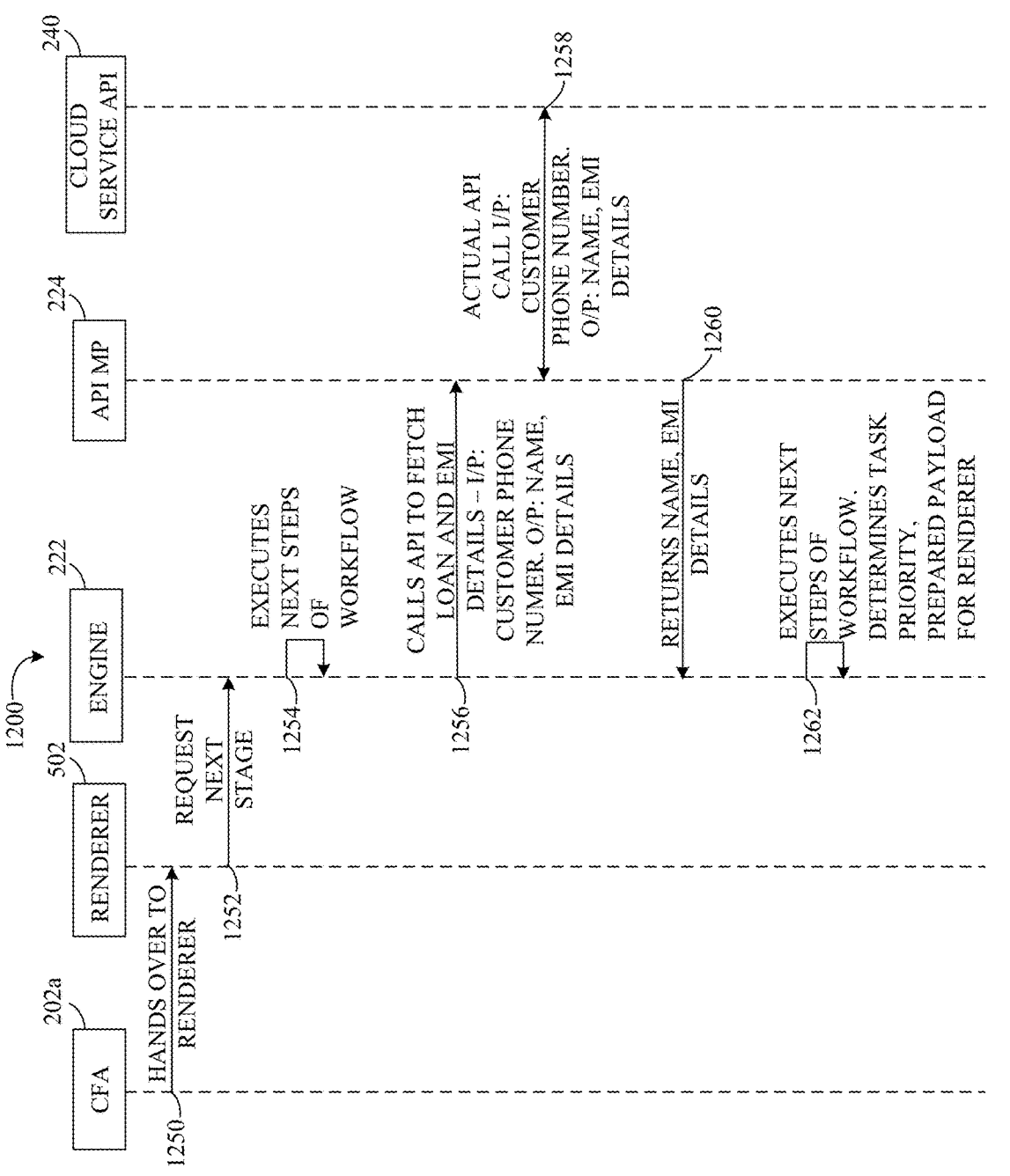
Figure 12F:
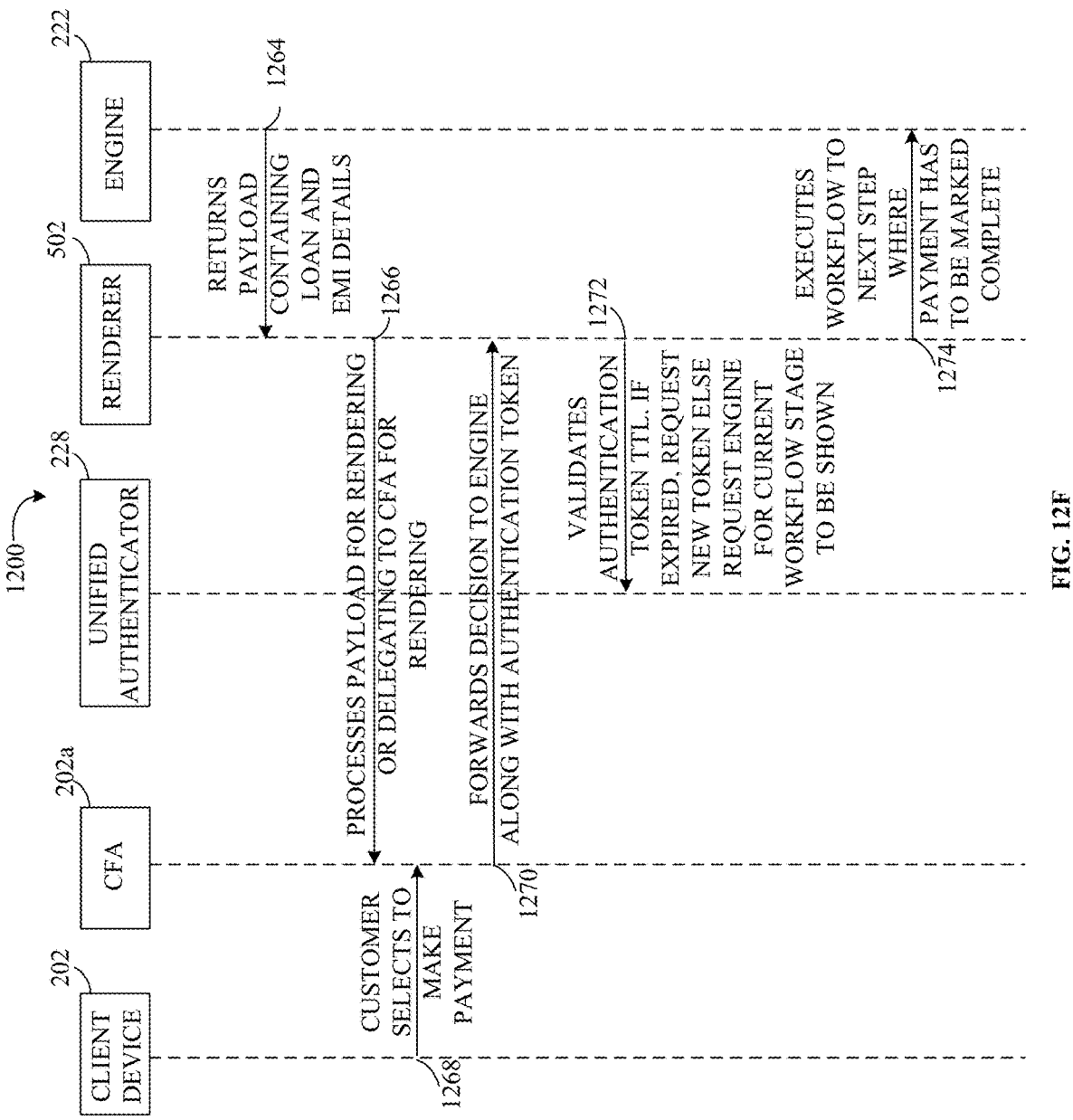
Figure 12G:
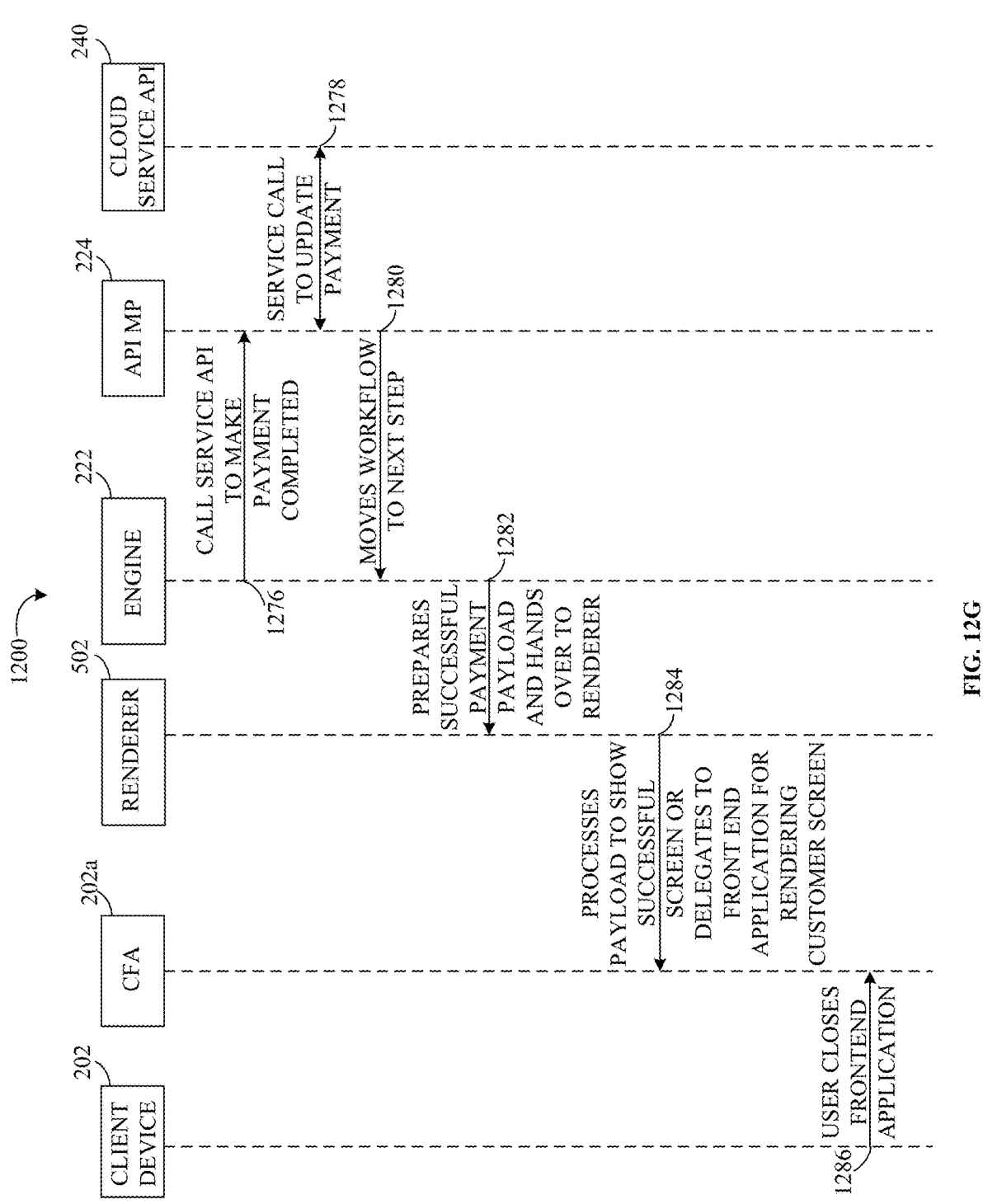

FIGS. 11A and 11B illustrate an example repayment workflow 1100, according to embodiments of the present disclosure. FIGS. 11A and 11B are described in conjunction with the previous figures. The repayment workflow 1100 represents instances when customers access a lender's website to make an EMI payment. At every step of the repayment workflow 1100, the engine 222 generates data with information such as a unique identifier, and metadata. The generated data information is used for generating analytics such as business insights and system insights.

The business insights can be created based on configuring variables, such as information or metadata, that may be explicitly published or made available for the external data sink 250. The variables may be configured to be permanent or transient. In some embodiments, the inputs provided to the APIs and the output from the workflow are the variables. Also, information that may be utilized for analytics are referred to as the variables. For example, a client may be interested in determining geographies of individuals accessing the custom application, however, personal data related to the individuals should remain hidden. The developer 232 may configure variables related to geography of the individuals to be permanent, visible, bound, or published and variables related to personal data may be configured to be transient, hidden, unbound, or unpublished. The visibility of the metadata generated during the execution of the workflow allows the developer 232 to take data driven decisions. The business insights can be generated by marking or considering one or more specific vertices of the workflow.

The business insights include an adhoc insight, which is provided during the course of an end user's journey or during an execution of the workflow that may be utilized if data is required to be modified by performing a manual action by an operational team. For example, unblocking a credit card transaction where a transaction was suspected to be fraudulent but upon the end user's request, the transaction shall be moved forward.

The business insight includes a calculated insight for instances, situations, or cases where information may have to be joined with data that is not currently available in a database corresponding to the CADMS 200, such as the insights data store 236. For example, data from an external API, such as from core services block 240, may be fetched for calculating a market value of a stock. The value for the quantity is obtained from the insights data store 236 and price is obtained from the core services block 240. A product of the quantity and the price is the analytics information that may be presented to the user or utilized for any further steps of the process corresponding to the workflow. The business insight also includes a runtime insight where information is retrieved from the insights data store 236, for operational purposes. As mentioned previously, the system insight is derived based on the granular events stored in the insights data store 236. In some embodiments, the business insight may be built or created using the BIT 324.

The repayment workflow 1100 is a directed graph representing a loan repayment process. A block 1102 indicates a process time out information for the repayment workflow 1100. The repayment workflow 1100 begins with a start event block 1104 and control or data is provided to a vertex 1108 and vertex 1112 through a gateway 1106. The vertex 1108 is configured as a service task and the engine 222 executes a fetch loans activity corresponding to the vertex 1108. The engine 222 accesses data and fetches the data corresponding to existing loans from a database. The engine 222 then executes a fetch loans insight activity corresponding to a vertex 1110. The business insights may be generated by considering the vertex 1110 of the workflow. The data or control from the vertex 1110 is passed to a sub-process block 1116 for a sub-process corresponding to fetching loan details. The execution of the sub-process block 1116 begins at a start event block 1118 and the data or control from the vertex 1110 is provided to the vertex 1120 that is configured as the service task. The engine 222 executes a fetch mandate status activity corresponding to the vertex 1120. Further, the engine 222 executes a fetch Virtual Account Number (VAN) activity corresponding to a vertex 1122 followed by execution of a fetch loan details activity corresponding to a vertex 1124. The vertex 1120, vertex 1122, and vertex 1124 are configured as the service tasks. The sub-process ends at an event block 1126 and output from the sub-process block 1116 is provided to a gateway 1128. The activities corresponding to the sub-process block 1116 may be multi-instance and undergo non-sequential processing.

A vertex 1112, configured as a service task, also receives the data or control from the gateway 1106 and the engine 222 executes a fetch leads activity corresponding to the vertex 1112. The engine 222 further executes an activity related to fetch leads insights corresponding to a vertex 1114 and the business insights may be generated by considering the vertex 1114 of the workflow. The outputs from the vertex 1114 and the sub-process block 1116 are provided to a vertex 1130 through the gateway 1128. The vertex 1130 is configured as a user task and the engine 222 executes an activity related to the user task to receive inputs from an end user regarding loan details of the user. On executing the activity related to the user task of the vertex 1130, the engine 222 may instruct the renderer 502 to render a user interface to receive the loan details from the end user. The activity corresponding to the vertex 1130 may be linked to a timer start event, on expiration of a corresponding time limit to receive the input from the end user, the engine 222 may terminate the loan repayment process at a terminate event block 1132.

On the other hand, upon receiving the inputs from the end user, the inputs are provided to a vertex 1134 and the business insights related to loan details may be generated by considering information available at the vertex 1134 of the workflow. The information is provided to a vertex 1136 that is configured as a service task, the engine 222 executes an activity to create a repayment link. Based on at least the input from the end user, the engine 222 may fetch details corresponding to a loan linked to the user and create the repayment link. The data is provided to a vertex 1138 and the business insights related to creation of the repayment link may be generated by considering information available at the vertex 1138 of the workflow.

The repayment link is provided to a vertex 1140 that is configured as a user task. The engine 222 instructs the renderer 502 to render a payment screen with the repayment link and the end user may interact, such as click, on the repayment link as an input to the vertex 1140. The vertex 1140 is linked to a conditional start event, a message start event, and a timer intermediate event. For example, the conditional start event may be detection or determination of a received user input and a message start event may wait until a message is completely received that can be provided to the user. Also, for example, the timer intermediate event is triggered when the payment screen is rendered with the repayment link and defined as time cycle with repetitions greater than zero. On expiry of the timer intermediate event, the control or data is provided to a vertex 1142 that is configured as a service task. The engine 222 executes an activity corresponding to the vertex 1142 to fetch payment status and ends the loan repayment process at an end event block 1144.

In a situation where the user interacts with the repayment link and pays for the loan, the data related to the conditional start event or the message start event are provided to a vertex 1148 through the exclusive OR gateway 1146 and the business insights related to payment screen may be generated by considering information available at the vertex 1148 of the workflow. Further, the data from the payment screen, data related to the payment, such as success or failure of the payment may be provided at a final screen, on executing an activity corresponding to a vertex 1150, by the engine 222. The final screen may be rendered by the renderer 502. The vertex 1150 is configured as a user task for rendering the final screen. The vertex 1150 is linked to a timer start event, which upon receiving an interactive input at the final screen, such as close, or upon timeout of the timer start event, data corresponding to the final screen is provided to a vertex 1154 though a gateway 1152. Also, the data from the final screen may be provided to the gateway 1152 without any involvement of the timer start event. The business insights related to the final screen may be generated by considering data available at the vertex 1154 of the workflow and terminates the loan repayment process at a terminate event block 1156.

FIGS. 12A, 12B, 12C, 12D, 12E, 12F, and 12G illustrate an example sequence diagram 1200 of an Equated Monthly Installment (EMI) management and payment procedure, according to embodiments of the present disclosure. FIGS. 12A, 12B, 12C, 12D, 12E, 12F, and 12G are described in conjunction with the previous figures. The procedure begins at instant 1202 when an end user of the client system 203 enters a login information such as a phone number in the CFA 203a. Based on the received phone number, at instant 1204, the CFA 203a specifies a client ID relative to a custom application, such as an EMI payment application number, to the unified authenticator 228. The unified authenticator 228, upon receiving the client ID, initializes authentication for the end user to access an EMI payment workflow associated with the EMI payment application number and delegates control to the engine 222, at instant 1206.

The engine 222, at instant 1208, initializes and executes an authentication workflow to generate a challenge, and then calls an API through the API-MP 224 to send an OTP to the end user's mobile number at instant 1210. At instant 1212, the API of the core services block 240 sends the OTP to the API-MP 224. The core services block 240 is also referred to as the cloud service API 240. The API-MP 224, at instant 1214, returns or notifies a success or failure status corresponding to generation of the OTP to the engine 222. On receiving the status, the engine 222 returns an authentication challenge to the unified authenticator 228 to forward to the CFA 203a, at instant 1216, as a response to authentication initialization at the instant 1206. The engine 222 further publishes events with a workflow unique identifier and metadata to the external data sink 250, at instant 1218. Further, at instant 1220, the external data sink 250 delegates control of data related to the publishes events to the data consumer 226 based data ownership. At instant 1222, the data consumer 226 stores the data at the storage-internal 236 for insight and external consumption.

The unified authenticator 228, after the instant 1216, renders the authentication challenge to the CFA 203a, at instant 1224. At instant 1226, the end user enters the OTP at the CFA 203a and the CFA 203a sends the end user entered challenge response to the unified authenticator 228 at instant 1228. At instant 1230, the unified authenticator 228 forwards, the received OTP or the challenge response to the engine 222 and the engine 222 executes a step of the corresponding workflow at instant 1232. Further, the engine 222, at instant 1234, publishes events with the workflow unique identifiers and metadata to the external data sink 250. The external data sink 250 delegates control of data related to the published events to the data consumer 226 based data ownership, at instant 1236, and the data consumer 226 then stores the data at the storage-internal 236, at instant 1238, for insight and external consumption.

At instant 1240, the engine 222 calls an API to validate the received OTP through the API-MP 224. The API-MP 224 then interacts with the cloud service API 240 and validates the OTP, at instant 1242. Further, the API-MP 224 returns the OTP validation result, which is success or failure, at instant 1244, to the engine 222. At instant 1246, the engine 222 provides responses, such as the login being successful and issues an authentication token or gives a soft or hard login failure to the unified authenticator 228. The unified authenticator 228, at instant 1248, notifies login success or failure to the CFA 203a.

At instant 1250, the CFA 203a hands over control to the renderer 502, which then requests the engine 222, at instant 1252, for proceeding to next step. The engine 222, at instant 1254, executes the next steps of the workflow. The engine 222, at instant 1256, calls an API to fetch loan and EMI details through the API-MP 224, the input to the API is the end user's or customer's phone number and the API returns name and EMI details of the end user as an output. At instant 1258, the API-MP 224 makes an actual API call with the user's phone number and receives the name and EMI details of the user as the output. The API-MP 224 returns the name and the EMI details to the engine 222, at instant 1260. Further, the engine 222 executes next steps of workflow and determines task priority, and payload for the renderer 502, at instant 1262.

The engine 222 returns payload containing loan and EMI details of the end user to the renderer 502, at instant 1264. The renderer 502, at instant 1266, processes payload for delegating to the CFA 203a for rendering. The user on receiving the payload, selects an option to make a payment, at instant 1268 on the CFA 203a. At instant 1270, the CFA 203a forwards the received selection to the engine 222 along with the authentication token through the renderer 502. The renderer 502, at instant 1272, receives validated TTL of the authentication token from the engine 222. If expired, the renderer 502 requests a new token from the engine 222, or else requests the engine 222 for current workflow step to be shown. At instant 1274, the renderer 502 or the engine 222 executes the workflow to move to the next step where the payment has to be marked complete.

The engine 222 then calls an API to mark payment completed through the API-MP 224, at instant 1276, and the API-MP 224 calls the API or the service from the cloud service API 240 to update payment status, at instant 1278. Further, at instant 1280, the engine 222 moves the workflow to the next step from the API-MP 224. The engine 222, at instant 1282, prepares a successful payment payload and hands over to the renderer 502. The renderer 502, at instant 1284, processes the successful payment payload to generate a screen notifying success or delegates the control to the CFA 203a for rendering a customer screen. On determining success of the EMI payment, the user closes the CFA 203a, at instant 1286.

The CADMS 200 simplifies usage of the microservices through the plug and play mechanism for developing any custom applications. The CADMS 200 provides the LCNC platform to design, develop, and deploy workflow for custom applications. Further, the CADMS 200 supports traceability of each step of the workflow for inspection, error identification and resolution, in real-time. The CADMS 200 supports orchestration among the disparate services and uses services as the anchor points, thereby avoiding writing codes for the realization of the application and also reduces the requirement of a developer to develop and maintain the applications. The usage of the CADMS 200 reduces the total cost of ownership involving the development and maintenance of the custom applications. Further multiple products with high scalability can be achieved using the CADMS 200, in a short duration, and the CADMS 200 also allows reusability of multiple microservices that improves agility. Due to the scalability achieved by underlying architecture and deployment design, multiple workflows or custom applications may be executed simultaneously.

The terms "user," "developer," "designer," and "client" may be interchangeably used unless specified otherwise.

Other embodiments include combinations and sub-combinations of features described or shown in the drawings herein, including for example, embodiments that are equivalent to: providing or applying a feature in a different order than in a described embodiment, extracting an individual feature from one embodiment and inserting such feature into another embodiment; removing one or more features from an embodiment; or both removing one or more features from an embodiment and adding one or more features extracted from one or more other embodiments, while providing the advantages of the features incorporated in such combinations and sub-combinations. As used in this paragraph, feature or features can refer to the structures and/or functions of an apparatus, article of manufacture or system, and/or the steps, acts, or modalities of a method.

These and other changes can be made to the embodiments in light of the above-detailed description. In general, in the following claims, the terms used should not be construed to limit the claims to the specific embodiments disclosed in the specification and the claims but should be construed to include all possible embodiments along with the full scope of equivalents to which such claims are entitled. Accordingly, the claims are not limited by the disclosure.

We claim:

1. A method of creating a computer-implemented application, the method comprising:

providing a directed graph having vertices and directed edges connecting respective pairs of the vertices, the directed graph representing a workflow, the vertices being associated with respective predefined tasks in the workflow, and the directed edges representing transitions and/or dataflow between the predefined tasks;

modifying the predefined tasks based on parameters received from a developer to customize implementations of the predefined tasks;

retrieving application programming interfaces (APIs) that implement the predefined tasks; and integrating the APIs using a workflow orchestration engine to provide executable instructions, wherein, the executable instructions, when executed by a processor, perform the workflow represented by the directed graph, and wherein the workflow orchestration engine further coordinates:

dynamically rendering, during execution of a user task, a user interface (UI) generated by reconstructing a schema via a renderer library, publishing granular execution events corresponding to state transitions of the workflow to an event broker and consuming the granular execution events at a data consumer, and monitoring execution of the executable instructions to generate performance data associated with individual vertices of the directed graph, wherein each granular execution event reflects execution of a vertex within the workflow.

2. The method of claim 1, further comprising:

storing the performance data on a memory.

3. The method of claim 1, wherein the workflow orchestration engine further coordinates directing data consumed at the data consumer to a data sink.

4. The method of claim 1, wherein the APIs that are retrieved to implement the predefined tasks are independently implementable without requiring a separate middleware and/or a separate user interface (UI).

5. The method of claim 1, wherein retrieving the APIs that implement the predefined tasks further comprises:

selecting the APIs via interactions with an external cloud service API, the selected APIs being listed in an API marketplace (API-MP) and being selected in accordance with a definition of the predefined tasks corresponding to the respective vertices; and binding inputs and outputs of the selected APIs to variables in the workflow.

6. The method of claim 1, further comprising executing the workflow by the workflow orchestration engine interacting with an API-marketplace (API-MP) to send the variables of the workflow as inputs in calls to the APIs and binding outputs to the variables of the workflow.

7. The method of claim 1, wherein the predefined tasks associated with the vertices include one or more of a timers task, a service task, or a user task.

8. The method of claim 7, wherein the vertices of the directed graph are respectively assigned symbols from a palette of symbols, each of the symbols being associated with a corresponding predefined task of the predefined tasks and one or more symbols corresponding to the service task are associated with one or more APIs in an API-marketplace (API-MP), and retrieving the APIs that implement the predefined tasks is performed by selecting, for a given vertex of the directed graph, an API from the one or more APIs associated with a symbol at the given vertex.

9. The method of claim 1, wherein a predefined task of the predefined tasks associated with one or more of the vertices is a user task, the user task including a form that includes a field for receiving input from a user of the executable instructions, the form including customizable settings.

10. A computing apparatus comprising:

a processor; and a memory storing instructions that, when executed by the processor, configure the apparatus to perform a workflow represented by a directed graph, the instructions being generated by:

providing the directed graph having vertices and directed edges connecting respective pairs of the vertices, the directed graph representing the workflow, the vertices being associated with respective predefined tasks in the workflow, and the directed edges representing transitions and/or dataflow between the predefined tasks;

modifying the predefined tasks based on parameters received from a developer to customize implementations of the predefined tasks;

retrieving application programming interfaces (APIs) that implement the predefined tasks; and integrating the APIs using a workflow orchestration engine to provide executable instructions, wherein the workflow orchestration engine further coordinates:

dynamically rendering, during execution of a user task, a user interface (UI) generated by reconstructing a schema via a renderer library, publishing granular execution events corresponding to state transitions of the workflow to an event broker and consuming the granular execution events at a data consumer, and monitoring execution of the executable instructions to generate performance data associated with individual vertices of the directed graph, wherein each granular execution event reflects execution of a vertex within the workflow.

11. The apparatus of claim 10, wherein, the instructions, when executed by the processor, further configure the apparatus to:

storing the performance data in the memory or in another memory.

12. The apparatus of claim 10, wherein the workflow orchestration engine further coordinates directing data consumed at the data consumer to a data sink.

13. The apparatus of claim 10, wherein the APIs that are retrieved to implement the predefined tasks are independently implementable without requiring a separate middleware and/or a separate user interface (UI).

14. The apparatus of claim 10, wherein retrieving the APIs that implement the predefined tasks further comprises:

selecting the APIs via interactions with an external cloud service API, the selected APIs being listed in an API marketplace (API-MP) and being selected in accordance with a definition of the predefined tasks corresponding to the respective vertices; and binding inputs and outputs of the selected APIs to variables in the workflow.

15. The apparatus of claim 10, wherein, the instructions, when executed by the processor, further configure the apparatus to:

execute the workflow by the workflow orchestration engine interacting with an API-marketplace (API-MP) to send variables of the workflow as input values in calls to the APIs and binding output values to the variables of the workflow.

16. The apparatus of claim 10, wherein the predefined tasks associated with the vertices include one or more of a timers task, a service task, or a user task.

17. The apparatus of claim 16, wherein:

the vertices of the directed graph are respectively assigned symbols from a palette of symbols, each of the symbols being associated with a corresponding predefined task of the predefined tasks and one or more symbols corresponding to the service task are associated with one or more APIs in an API-marketplace (API-MP), and retrieving the APIs that implement the predefined tasks is performed by selecting, for a given vertex of the directed graph, an API from the one or more APIs associated with a symbol at the given vertex.

18. The apparatus of claim 10, wherein a predefined task of the predefined tasks associated with one or more of the vertices is a user task, the user task including a form that includes a field for receiving input from a user of the executable instructions, the form including customizable settings.

*    *    *    *    *